US011131444B2

(12) United States Patent
James et al.

(10) Patent No.: US 11,131,444 B2
(45) Date of Patent: Sep. 28, 2021

(54) LUMINAIRE STRUCTURE

(71) Applicant: AXIS LIGHTING INC., Lasalle (CA)

(72) Inventors: Thomas James, Lasalle (CA); Howard Yaphe, Lasalle (CA); Andrew Miles, Lasalle (CA); Jamie Katz, Lasalle (CA)

(73) Assignee: Axis Lighting Inc., LaSalle (CA)

( * ) Notice: Subject to any disclaimer, the term of this patent is extended or adjusted under 35 U.S.C. 154(b) by 83 days.

(21) Appl. No.: 16/422,319

(22) Filed: May 24, 2019

(65) Prior Publication Data

US 2019/0346119 A1    Nov. 14, 2019

Related U.S. Application Data

(63) Continuation-in-part of application No. 29/689,730, filed on May 1, 2019, and a continuation-in-part of
(Continued)

(51) Int. Cl.
*F21V 21/02*      (2006.01)
*F21V 8/00*      (2006.01)
(Continued)

(52) U.S. Cl.
CPC .............. *F21V 21/02* (2013.01); *F21V 15/01* (2013.01); *F21V 19/001* (2013.01); *F21V 23/02* (2013.01);
(Continued)

(58) Field of Classification Search
CPC ........ F21V 21/02; F21V 15/01; F21V 19/001; F21V 23/02; F21Y 2103/10; F21Y 2115/10
See application file for complete search history.

(56) References Cited

U.S. PATENT DOCUMENTS

D206,286 S    11/1966   Ostyn
5,452,187 A    9/1995   Belfer et al.
(Continued)

OTHER PUBLICATIONS

Eaton, Corelite Divide-DWI (Jun. 14, 2017).
(Continued)

*Primary Examiner* — Andrew J Coughlin
*Assistant Examiner* — Jessica M Apenteng
(74) *Attorney, Agent, or Firm* — Barnes & Thornburg LLP

(57) ABSTRACT

A luminaire assembly comprises a first luminaire structure and a second luminaire structure, each configured for positioning in an illuminatable position on an enclosure surface. Each of the first and second luminaire structures comprises a housing structure and an illumination structure extending outwardly from the housing structure. The illumination structure has at least one outer surface region which terminates at a longitudinal distal end region and at least one lateral edge region, wherein the respective lateral edge regions of the first and second luminaire structures are alignable to form an aligning interface therebetween. A clamp assembly is configured for clamping the adjacent lateral end regions in the aligning interface to join the first and second luminaire structures together, the clamp assembly providing at least one outer clamp surface region which is configured to be complementary with the corresponding at least one outer surface region of each of the joined first and second luminaire structures.

15 Claims, 35 Drawing Sheets

Related U.S. Application Data application No. 29/614,751, filed on Aug. 22, 2017, now Pat. No. Des. 895,195.

(51) Int. Cl.
  *F21V 23/02* (2006.01)
  *F21V 15/01* (2006.01)
  *F21V 19/00* (2006.01)
  *F21Y 115/10* (2016.01)
  *F21Y 103/10* (2016.01)

(52) U.S. Cl.
  CPC ........ *G02B 6/0001* (2013.01); *F21Y 2103/10* (2016.08); *F21Y 2115/10* (2016.08)

(56) References Cited

U.S. PATENT DOCUMENTS

| | | | |
|---|---|---|---|
| D521,676 | S | 5/2006 | Richner |
| D569,027 | S | 5/2008 | Hakamada |
| D624,231 | S | 9/2010 | Karim |
| D662,245 | S | 6/2012 | Steffy |
| D695,443 | S | 12/2013 | Kaule |
| D701,343 | S | 3/2014 | Ng |
| D731,103 | S | 6/2015 | Wilke |
| D743,090 | S | 11/2015 | Wilcox |
| D776,855 | S | 1/2017 | Rashid |
| D788,356 | S | 5/2017 | Clements |
| D797,357 | S | 9/2017 | Vasylyev |
| D804,711 | S | 12/2017 | Leadford |
| D806,927 | S | 1/2018 | Rashid |
| D808,059 | S | 1/2018 | Li |
| D813,432 | S | 3/2018 | Koshiba |
| D825,819 | S | 8/2018 | Sonneman |
| D826,462 | S | 8/2018 | Sonneman |
| D849,992 | S | 5/2019 | Deng |
| D855,248 | S | 7/2019 | Tweel |
| 10,961,700 | B2 | 3/2021 | Udagawa et al. |
| 2006/0146531 | A1 | 7/2006 | Reo |
| 2009/0316396 | A1* | 12/2009 | Tsai ............................ F21K 9/00 362/235 |
| 2013/0235576 | A1* | 9/2013 | Mcgowan ............... B42D 3/123 362/235 |

OTHER PUBLICATIONS

Eaton Corporation, Converge LED Architectural Luminaires, Neo-Ray (Jan. 2017).
Eaton, SkyBar High Bay LED Luminaire (Jul. 28, 2015).
GE, LED Luminaires, www.gelighting.com/indoorsolutions (Apr. 2015).
GE, Lumination LED Luminaires, Linear Suspended Fixture, www.currentbyge.com (Sep. 22, 2016).
Ledalite, ID-EL_Eyeline Wall (To the best of the Applicant's knowledge and understanding, the reference does not have a specific publication date but is believed to have been publicly available prior to the filing of the application on May 24, 2019).
Vode Lighting, ZipThree Wall Mount (2017).
U.S. Appl. No. 29/689,730, filed May 1, 2019.
U.S. Appl. No. 29/614,751, filed Aug. 22, 2017.

* cited by examiner

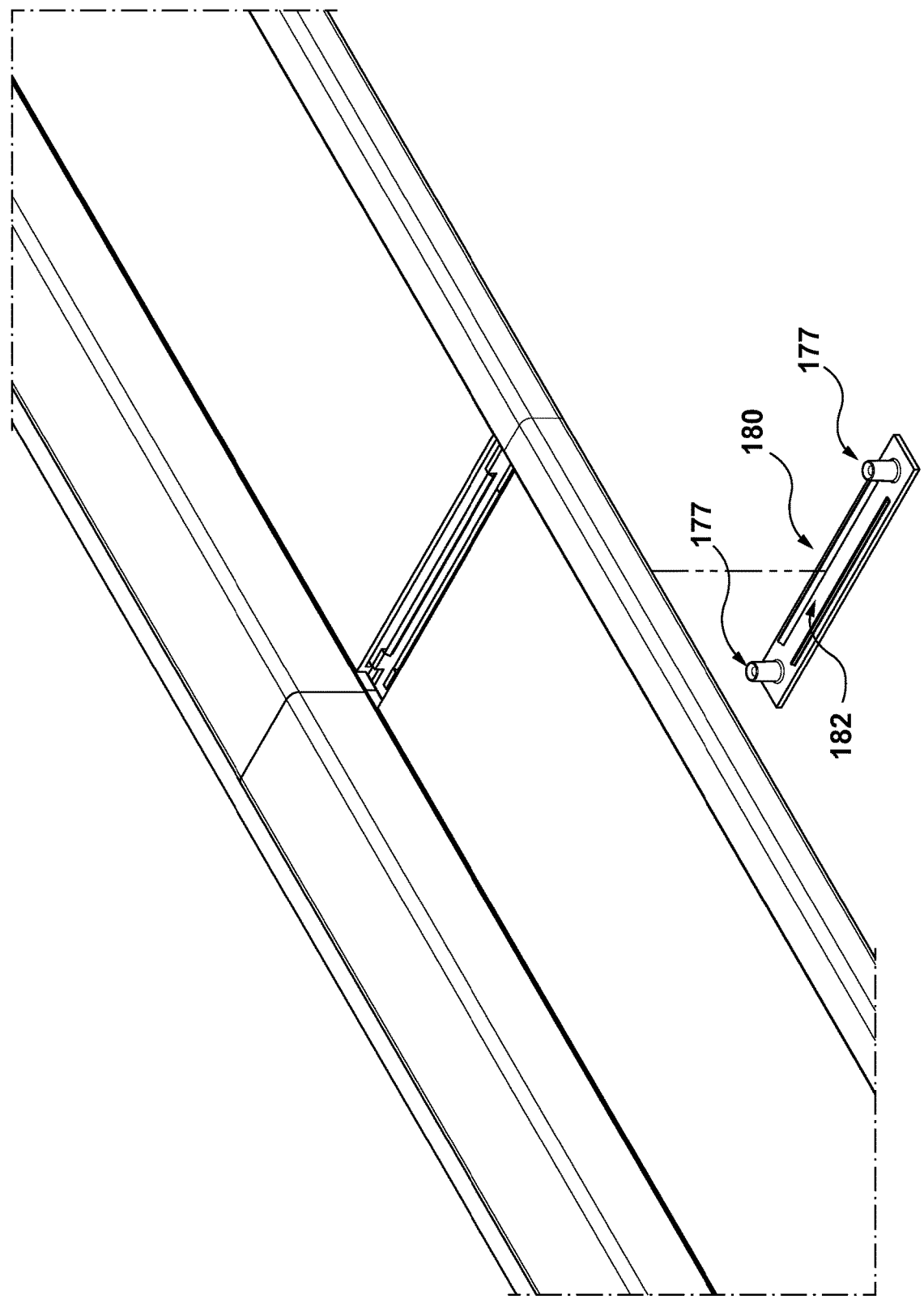

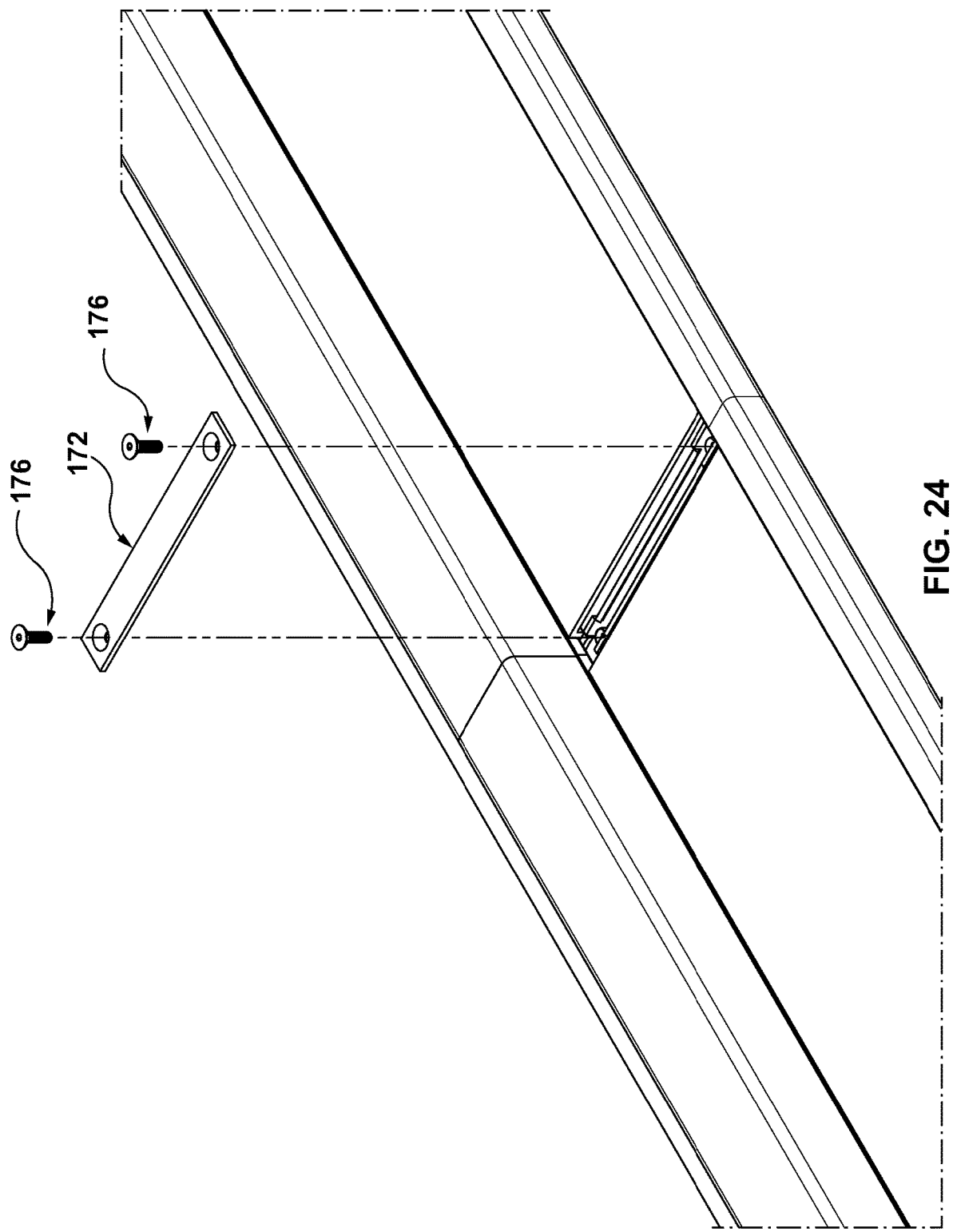

LUMINAIRE STRUCTURE

CROSS REFERENCE TO RELATED APPLICATIONS

This application is a Continuation-in-Part of U.S. Design patent application No. 29/614,751, filed Aug. 22, 2017, entitled LUMINAIRE STRUCTURE, and is a Continuation-in-Part of U.S. Design patent application No. 29/689,730, filed May 1, 2019, entitled LUMINAIRE STRUCTURE. The disclosures set forth in the applications referenced below are incorporated herein by reference in their entities.

FIELD OF THE DISCLOSURE

The present disclosure relates to luminaire structures and associated structures.

BACKGROUND

Wall- and ceiling-mounted luminaires are typically mounted to walls and ceilings and configured so present emitted light either in a direct or indirect light distribution mode. However, such mounted luminaires are often limited to one such mount configuration, in other words, they are configured for mounting on a wall or ceiling, but not both, and when so mounted are usually confined to one light distribution mode.

It would thus be desirable to provide novel approaches for the mounting of light fixtures, or at least to provide the public with one or more useful alternatives.

SUMMARY

An aspect provides luminaire assembly comprising a track structure mountable on a wall surface; and at least one luminaire structure for positioning on the track structure. The track structure has an anchoring surface region configured for securing to the wall surface at a plurality of designated locations, and a first mounting surface region to form a mount interface with a corresponding aligned second mounting surface region on the at least one luminaire structure in a luminaire installation. Each of the at least one luminaire structure include a housing structure defining the corresponding second mounting surface region; and an illumination structure extending outwardly from the housing structure, with opposed outer surface regions which terminate at a longitudinal distal end region. The housing structure comprises an elongate wall mounting segment extending along the luminaire structure, at least in part, defining the second surface region; an elongate supporting segment extending along the luminaire structure, at least in part, and configured for supporting the illumination structure in an operative position relative to the wall surface; and an elongate light source segment extending along the luminaire structure, at least in part, and configured for optical coupling with the illumination structure, wherein the elongate wall mounting segment, the elongate supporting segment and/or the elongate light source segment are coupled in a first mode to orient the illumination structure in the operative position, and decoupled, at least in part, in a second mode to enable servicing of the illumination structure and/or the elongate light source segment, while the elongate wall mounting segment remains in the mount interface.

In some example embodiments, the track structure and luminaire structure may be configured to provide visual continuity along one or more visible surfaces thereon in the first mode when viewed from a user space defined by the wall.

In some example embodiments, the track structure and luminaire structure may be configured to minimize light emitted by the illumination structure from leaking therebetween along the mount interface.

In some example embodiments, the elongate wall mounting segment may include an inner support structure with a plurality of passages to receive a corresponding plurality of first fasteners held in the track structure to secure the mount interface.

Some example embodiments may further comprise inner and outer casing structures to enclose the mount interface, at least in part.

In some example embodiments, the inner casing structure may be configured to be held between the track structure and the inner support structure in the mount interface, at least in part.

In some example embodiments, the track structure may include a track path to receive and adjustably position each of the first fasteners for aligning with a corresponding passage.

In some example embodiments, the elongate wall mounting segment, elongate supporting segment and or elongate light source segment may include complementary coupling locations to be coupled in the first mode.

In some example embodiments, the outer casing structure may be configured to cover the coupling locations in the first mode, at least in part.

In some example embodiments, the elongate supporting segment may support a light guide in an optical coupling configuration with the elongate light source segment, wherein the elongate light source segment is removable from the elongate support element in the second mode.

In some example embodiments, the light source segment may include one or more LED arrays orientable along a longitudinal axis extending along the light guide.

In some example embodiments, the light source segment may include a power supply for operative coupling to the one or more LED arrays.

In some example embodiments, the light source segment may include one or more of: a light source frame with a first frame portion to engage the elongate support segment, to support the elongate light source segment and to cooperate therewith to define the coupling locations; and a second upright frame portion to releasably support the one or more LED arrays releasably secured thereto.

In some example embodiments, the outer casing structure may be configured to be held between the elongate wall mounting segment and the elongate supporting segment.

In some example embodiments, the outer casing structure may include a pair of opposed longitudinal end regions, at least one of which is releasably clipped to the corresponding elongate wall mounting segment and the elongate supporting segment for removal therefrom.

In some example embodiments, the light guide may be provided with opposed inner and outer longitudinal light guide boundaries, the elongate supporting segment having a distal end region to engage a corresponding the inner longitudinal light guide boundary, and may further comprise a light guide clamp member configured with a corresponding end region to engage an opposite side of the corresponding inner longitudinal light guide boundary and releasably secured relative to the elongate support segment.

In some example embodiments, the housing structure may be configured with the elongate wall mounting segment and elongate supporting segments extending outwardly from a corner region.

In some example embodiments, the light guide clamp member may be releasably secured to the elongate light source segment.

In some example embodiments, the luminaire structure may further comprise at least one longitudinal end cap segment to engage the outer longitudinal light guide boundary.

In some example embodiments, the light guide may be provided with opposed lateral light guide boundaries, further comprising at least one end lateral cap segment to engage a corresponding lateral light guide boundary.

In some example embodiments, the longitudinal cap segment may include an opening to receive the corresponding longitudinal light guide boundary.

Some example embodiments may further comprise a pair of support arms, each extending along a corresponding lateral light guide boundary, each configured to be removably secured to the longitudinal cap segment.

In some example embodiments, each support arm may include a proximal end region which extends into the housing structure and held by a first fastener.

In some example embodiments, the illumination structure may include a pair of outer panels, each at a corresponding outer surface region, wherein each of the outer panels is held between the at least one lateral cap segment, the at least one longitudinal end cap segment, the inner casing structure, and/or the outer casing structure.

In some example embodiments, the outer panel adjacent the outer casing structure may be releasable upon release of the outer casing structure, or vice versa.

In another aspect, there is provided a luminaire assembly comprising a track structure mountable on a wall surface; and a first luminaire structure and a second luminaire structure, each for positioning on the track structure. The track structure has an anchoring surface region configured for securing to the wall surface at a plurality of designated locations, and a first mounting surface region to form a sliding mount interface with corresponding aligned second mounting surface regions on each of the first and second luminaire structures in a luminaire installation. Each of the first and second luminaire structures comprises a housing structure defining the corresponding second mounting surface region; and an illumination structure extending outwardly from the housing structure, with opposed outer surface regions which terminate at a longitudinal distal end region. Each illumination structure including opposed lateral end regions, each of which includes mounting structure to form an aligning mount interface with a neighboring lateral edge regions to form a unitary illumination panel. The sliding mount interface and the aligning mount interface are configured enable the track structure and housing structures to accommodate variations along the wall surface, while maintaining visual continuity along the unitary illumination panel and/or the distal edge region.

In some example embodiments, the opposed outer surface regions may be defined by outer panels extending between the housing structure and the longitudinal edge region.

In some example embodiments, at least one of the panels may be configured to emit light.

In some example embodiments, each of the outer panels may be provided with a pair of opposed lateral edges which terminate at an adjacent lateral end region, and may further comprising a clamp assembly for engaging the adjacent lateral end regions, the clamp assembly having outer surfaces which are configured to be substantially coplanar with the outer surfaces of the outer panels at the aligning interface.

In some example embodiments, the clamp assembly may include a pair of clamp elements to extend along opposite outer boundaries of the illumination panel, and configured to be drawn to one another to form the aligning interface.

In some example embodiments, each lateral edge region may include a support arm extending therealong between the housing structure and the distal end region, and configured to engage each of the clamp elements in the aligning interface.

In some example embodiments, each clamp element may include a pair of opposed first locking formations extending along opposite sides thereof, and each support arm may include a pair of opposed second locking formations along opposite sides thereof, wherein each of the first locking formations may engages a corresponding second formation which the clamp elements engage in the aligning interface.

In another aspect, there is provided a luminaire assembly comprising a first luminaire structure and a second luminaire structure, each configured for positioning in an illuminatable position on an enclosure surface. Each of the first and second luminaire structures comprises a housing structure and an illumination structure extending outwardly from the housing structure. The illumination structure has at least one outer surface region which terminates at a longitudinal distal end region and at least one lateral edge region, wherein the respective lateral edge regions of the first and second luminaire structures are alignable to form an aligning interface therebetween. A clamp assembly is configured for clamping the adjacent lateral end regions in the aligning interface to join the first and second luminaire structures together, the clamp assembly providing at least one outer clamp surface region which is configured to be complementary with the corresponding at least one outer surface region of each of the joined first and second luminaire structures.

In some example embodiments, the least one outer clamp surface region may be configured to be coplanar with the corresponding at least one outer surface region of each of the joined first and second luminaire structures to present substantially continuous outer surface region across the joined first and second luminaire structures through the aligning interface.

In some example embodiments, the housing structures may be provided with substantially equal cross-sectional first thicknesses, and the illumination structures may be provided with substantially equal cross-sectional second thicknesses, wherein the second thicknesses are smaller than the first thicknesses.

In some example embodiments, each illumination structure may include a pair of opposed outer surface regions which are defined by a pair of outer panels extending between the housing structure and the longitudinal edge region.

In some example embodiments, at least one of the outer panels may be configured to emit light.

In some example embodiments, the clamp assembly may include a pair of clamp elements, each to engage the lateral edge regions in the aligning interface.

In some example embodiments, each illumination structure may include at least one support arm extending along the lateral end region, to provide a pair of adjacent support arms at the aligning interface, each clamp element configured to engage each of the pair of adjacent support arms along the aligning interface, and to extend between a corresponding pair of adjacent outer surface regions.

In some example embodiments, the support arms and the clamp elements may be configured to draw the support arms toward one another, as the clamp elements are drawn toward one another at the aligning interface.

In some example embodiments, each clamp element may include a pair of opposed first locking formations extending along opposite sides thereof, and each support arm includes a pair of opposed second locking formations along opposite sides thereof, wherein each of the first locking formations may engage a corresponding second formation which the clamp elements engage in the aligning interface.

In some example embodiments, each illumination structure may comprise a longitudinal end cap segment extending along the corresponding longitudinal edge region and a pair of lateral edge regions, each with a corresponding support arm, wherein the support arms are releasably secured to the end cap segment.

In some example embodiments each luminaire structure may include at least one light guide with at least one outer panel on one side thereof, with one of the support arms at each lateral boundary of the light guide and/or outer panel, and a longitudinal end cap segment, wherein the support arms are releasably secured to the end cap segment.

In some example embodiments, the light guide may include an outer longitudinal light guide boundary, and the end cap segment includes a passage to receive the outer longitudinal light guide boundary.

In some example embodiments, each support arm may be secured to the housing structure.

Some example embodiments may further comprise a track structure for mounting on the enclosure surface, the track structure configured to receive a plurality of anchoring fasteners slidably mounted thereon, with each fastener adjustable in position along the track structure to align with complementary passages in the housing structures.

In some example embodiments, the track structure and housing structure may present complementary slidable-contact surfaces through which the anchoring fasteners extend to anchor the luminaire assembly on the enclosure surface, wherein each housing structure has a thin walled hollow cross sectional configuration, enabling the housing structure to flex to accommodate variations in the enclosure wall surface.

BRIEF DESCRIPTION OF THE FIGURES

Several example embodiments of the present disclosure will be provided, by way of examples only, with reference to the appended drawings, wherein:

FIGS. 20, 21, 21a, and 22 to 27 are fragmentary perspective assembly views of the luminaire assembly of FIG. 1;

DETAILED DESCRIPTION

Figure 1:
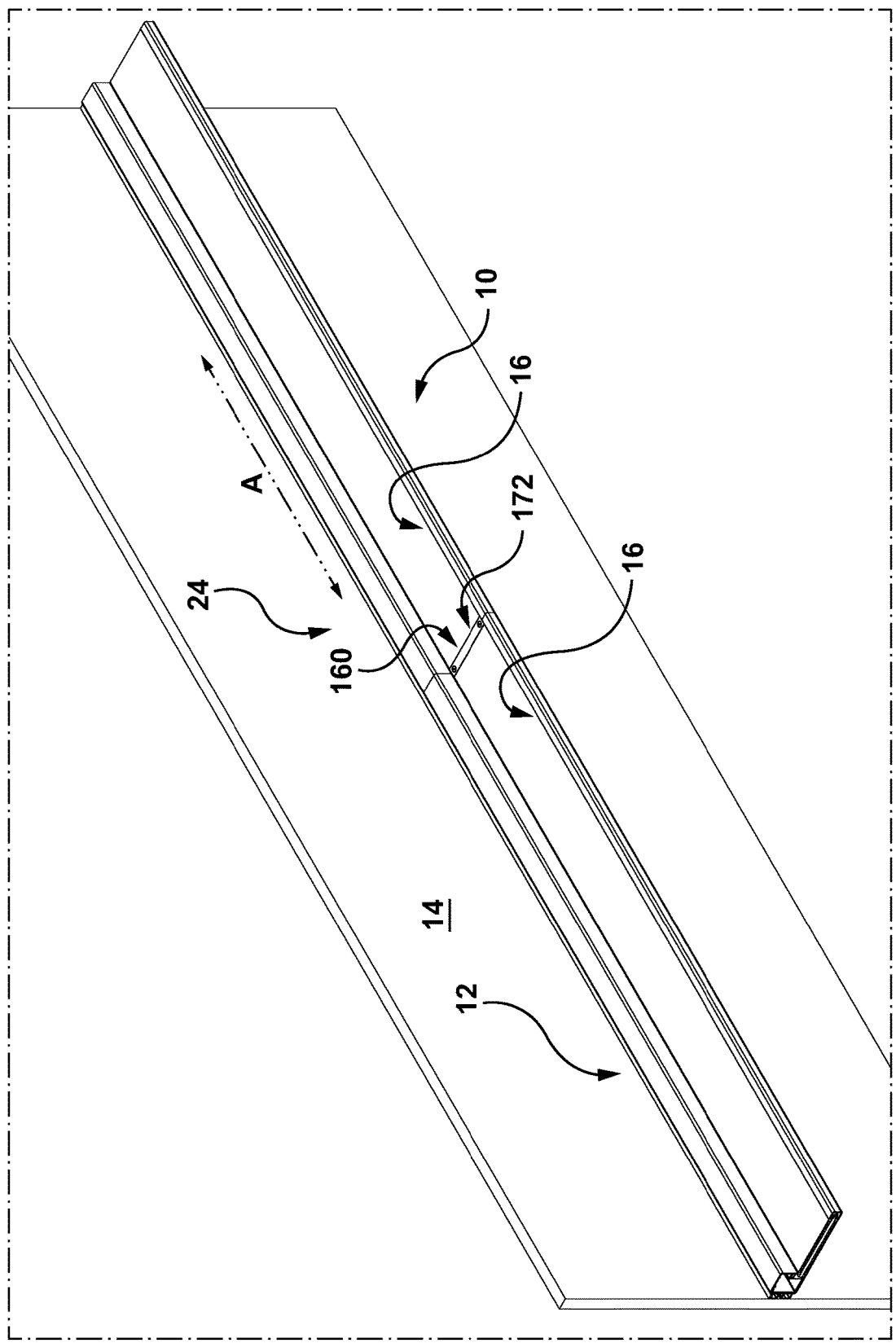
FIGS. 1, 4 are fragmentary perspective views of a luminaire assembly.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, and vertical are intended for operative context only and are not necessarily intended to limit the invention only to those configurations or orientations. Furthermore, and as described in subsequent paragraphs, the specific mechanical and/or other configurations illustrated in the drawings are intended to exemplify embodiments of the invention. However, other alternative mechanical and/or other configurations are possible which are considered to be within the teachings of the instant disclosure.

Referring to the figures, there is provided a luminaire assembly 10 comprising a track structure 12 mountable on an enclosure surface such as wall surface shown at 14, and a pair of luminaire structures 16 for positioning on the track structure 12, along a longitudinal axis "A". While the luminaire assembly 10 and other example embodiments herein are described as having longitudinal features and structures, the present disclosure encompasses other non-longitudinal example embodiments and/or variations of such features and structures which may not, in some cases, be longitudinal.

Figure 2:
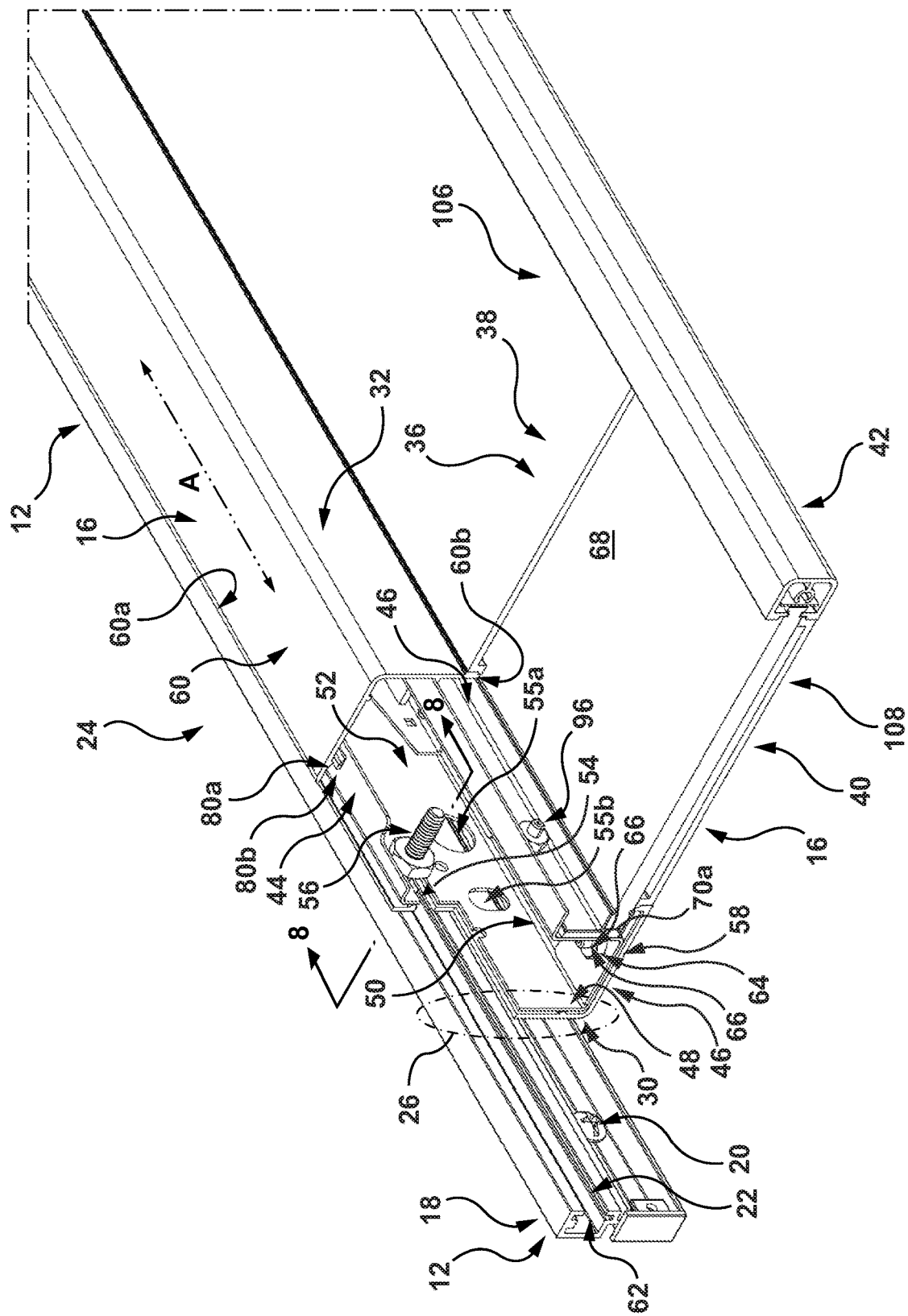
FIGS. 2, 3, 5 and 6 are fragmentary perspective assembly views of a luminaire structure of the luminaire assembly of FIG. 1.
Figure 3:
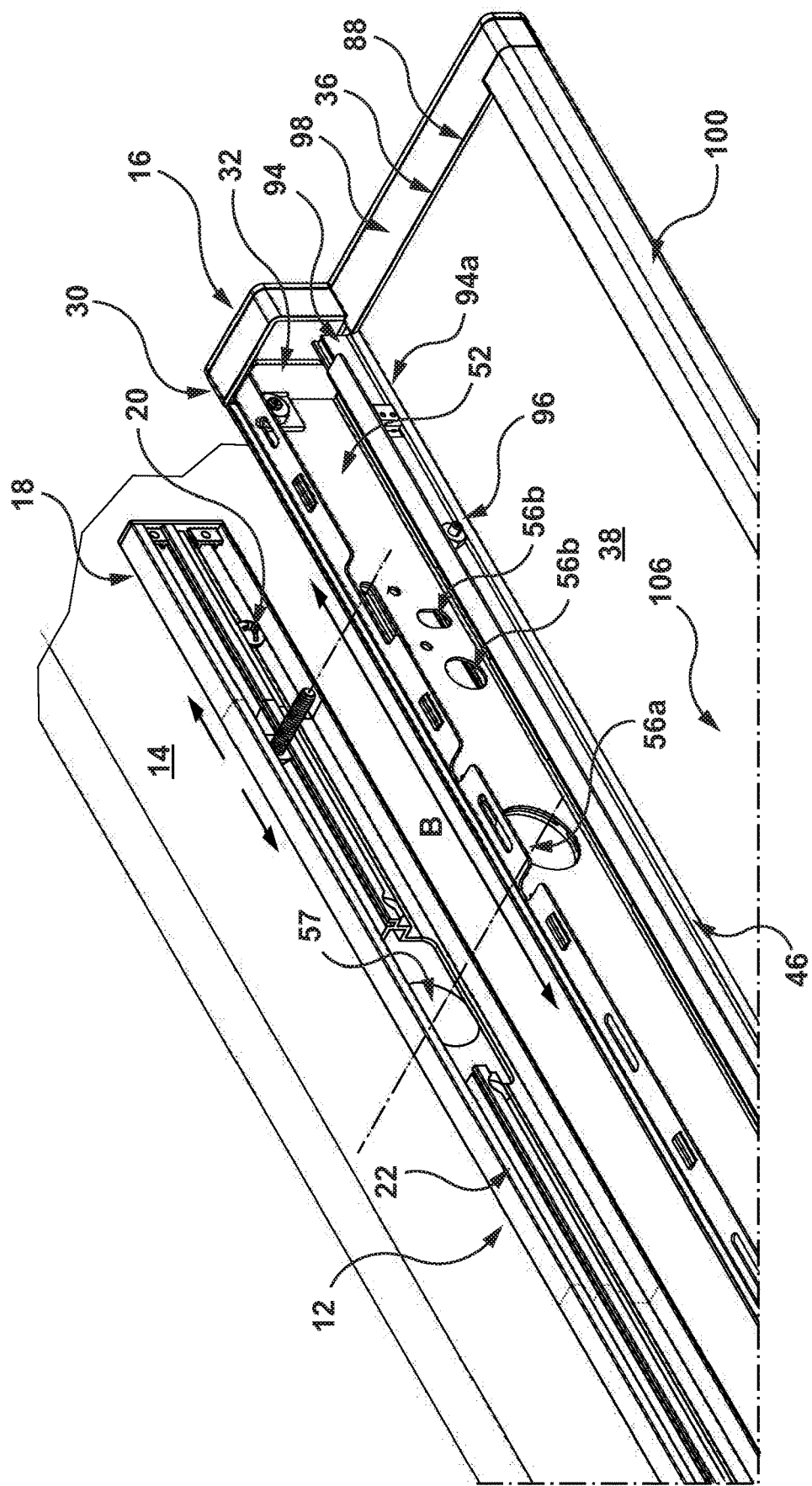

Referring to FIGS. 2 and 3, the track structure 12 has an anchoring surface region 18 configured for securing to the wall surface 14, at a plurality of designated locations with one shown at 20, and a first mounting surface region 22. The first mounting surface region 22 is configured to form a mount interface shown at 26, along a longitudinal axis A, with a corresponding aligned second mounting surface region 30 on the luminaire structure 16 in a luminaire installation as shown generally at 24.

The luminaire structure 16 includes a housing structure 32 which defines the corresponding second mounting surface region 30. An illumination structure 36 extends outwardly from the housing structure 32, with opposed outer surface regions 38, 40 which terminate at a longitudinal distal end region 42.

The housing structure 32 comprises an elongate wall mounting segment 44 extending along the luminaire structure 16, at least in part, and which defines the second mounting surface region 30.

Also provided is an elongate supporting segment 46 which extends along the luminaire structure 16, at least in part, and is configured for supporting the illumination structure 36 in an operative position relative to the wall surface 14. In this case, the elongate wall mounting segment 44 and the elongate supporting segment 46 may extend outwardly from a common corner region shown at 48.

Figure 5:
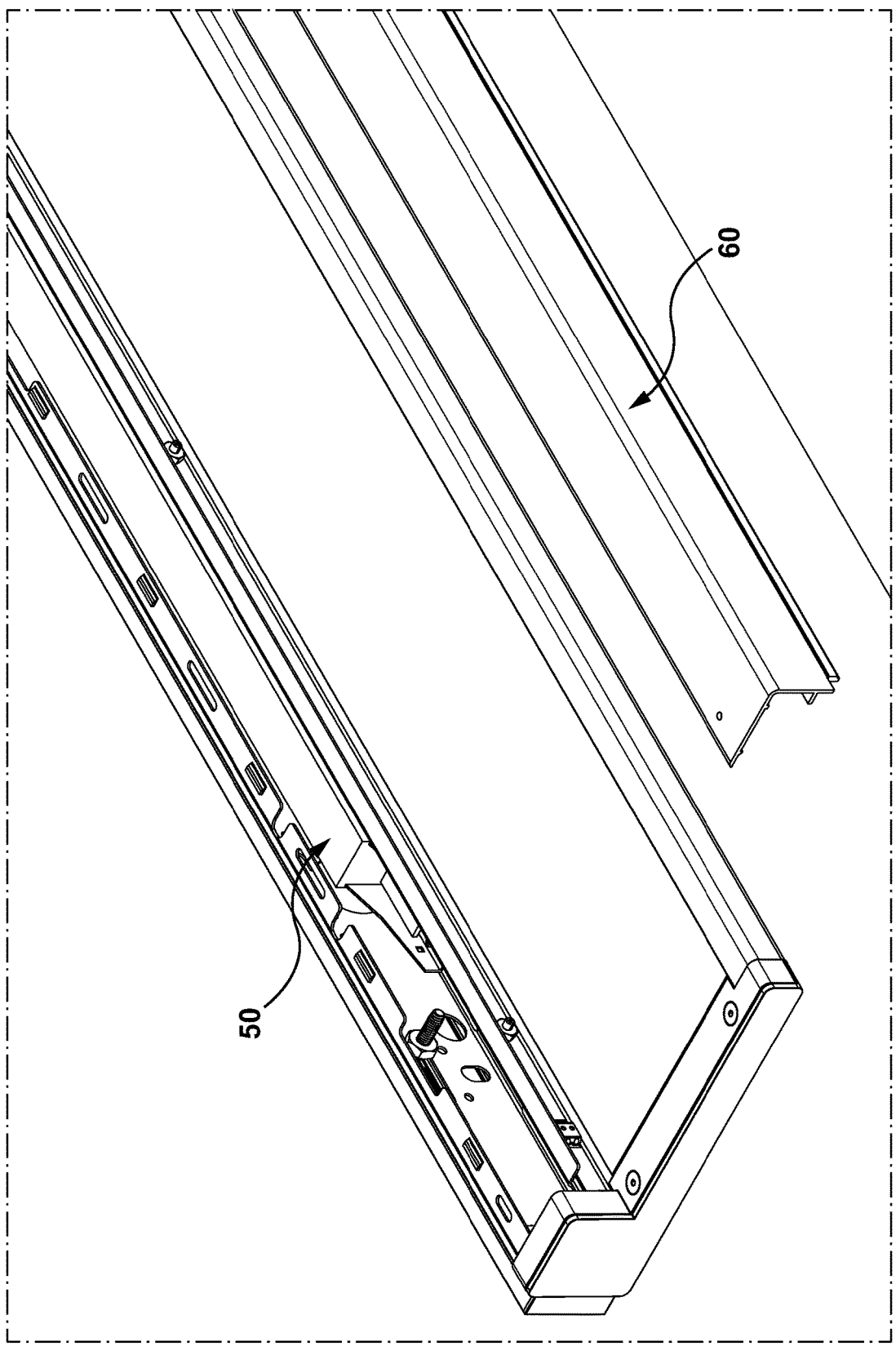
Figure 6:
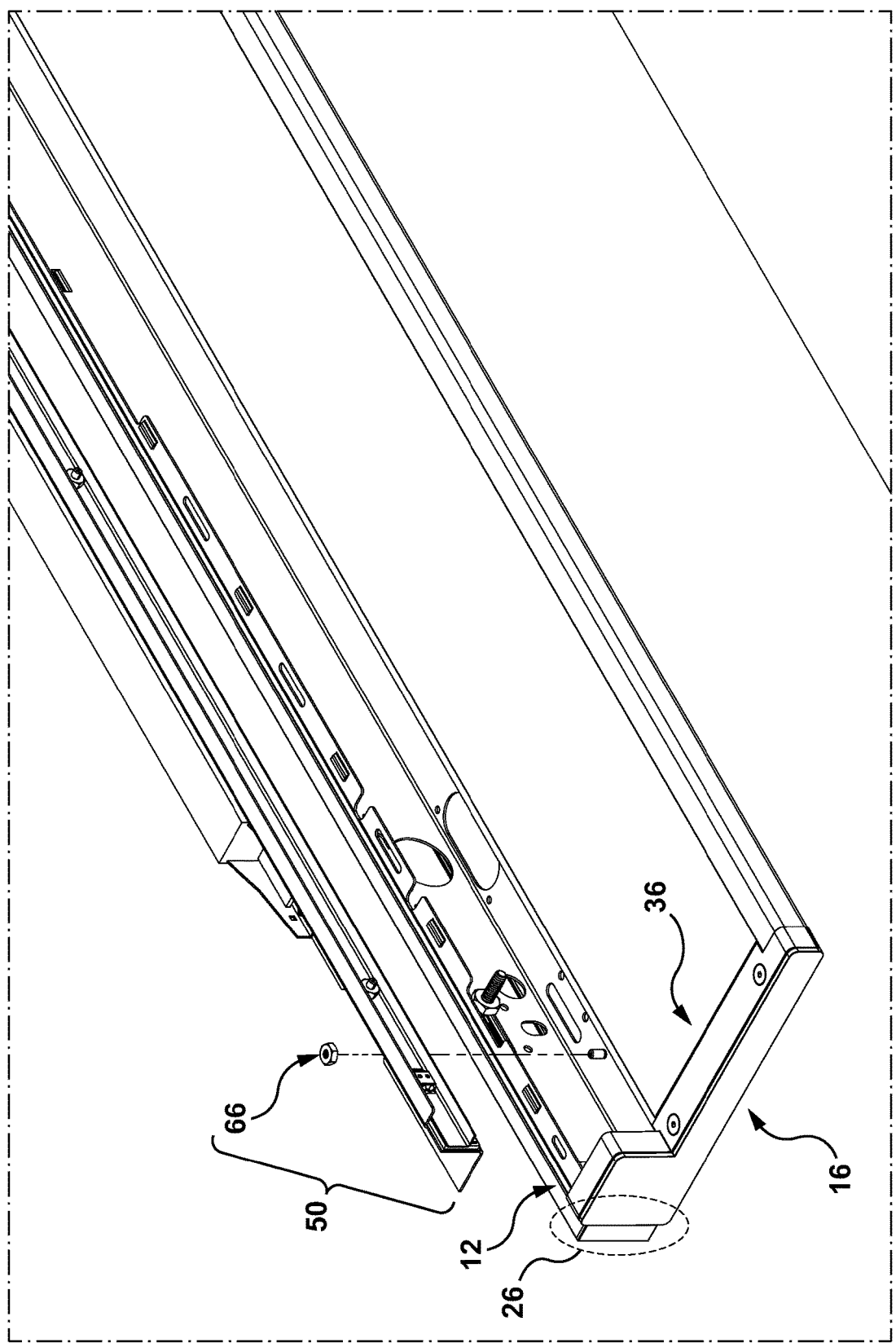

Referring to FIGS. 2, 5 and 6, an elongate light source segment 50 extends along the luminaire structure 16, at least in part, and is configured for optical coupling with the illumination structure 36.

In some example embodiments, the elongate wall mounting segment 44, the elongate supporting segment 46 and the elongate light source segment 50 may be coupled in a first mode as shown in FIG. 2, to orient the illumination structure 36 in the operative position, and decoupled, at least in part, in a second mode, as shown in FIG. 6, to enable servicing of the illumination structure 36 and/or the elongate light source segment 50, while the elongate wall mounting segment 44 remains in the mount interface 26.

Figure 8:
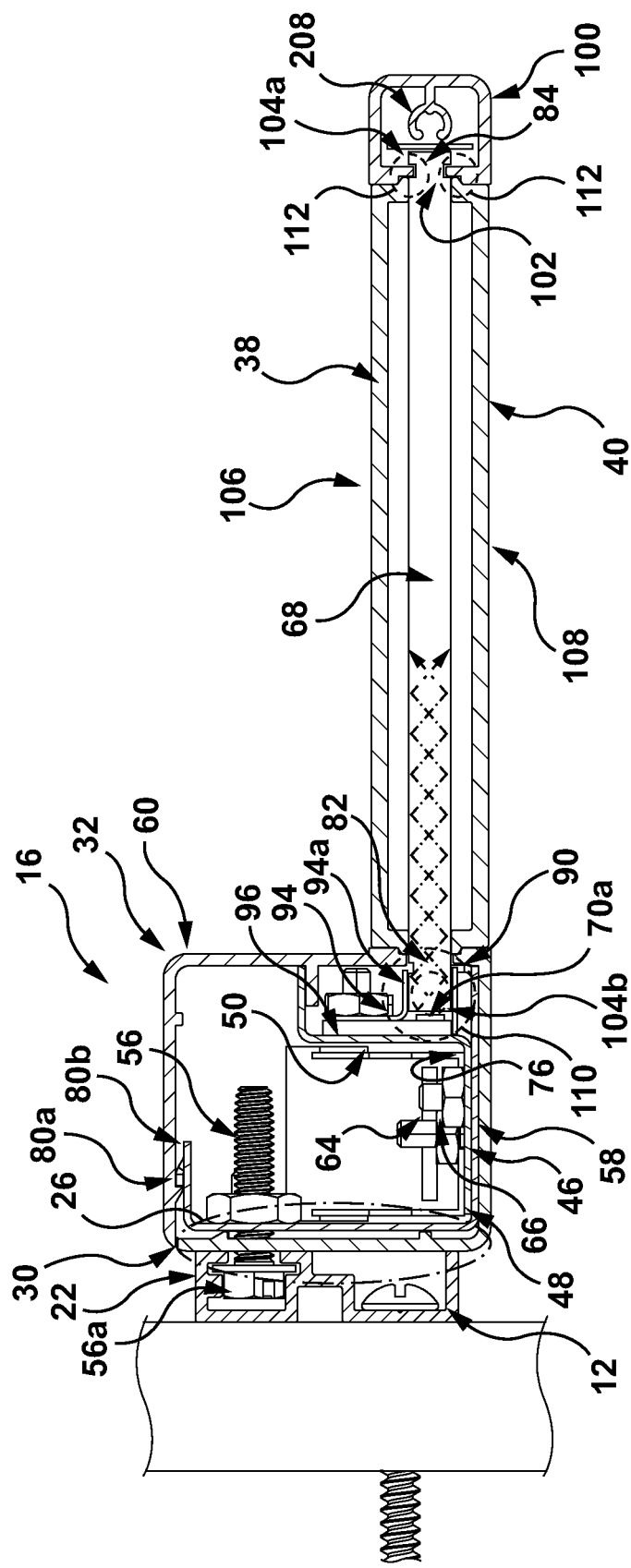
FIG. 8 is a sectional view taken on line 8-8 of FIG. 2.

In some example embodiments, as shown in FIG. 8, the track structure 12 and luminaire structure 16 may be configured to provide visual continuity along visible surfaces thereon in the first mode when viewed from a user space defined by the wall surface 14 and, if desired, on either side of the luminaire structure 16. In this case, the track structure 12 and luminaire structure 16 may be configured to minimize, if not block, light emitted by the illumination structure 36 from leaking between them, either from above or below the luminaire structure 16, as viewed in FIG. 8, and along the mount interface 26. This is provided, in one example, by the several points of contact along the first mounting region 22 and the second mounting region 30, which collectively serve to provide a substantially continuous light barrier along the longitudinal axis A.

Referring to FIGS. 2 and 3, the elongate wall mounting segment 44 includes an inner support structure 52 with a plurality of passages 54 to receive a corresponding plurality of first fasteners 56 held in the track structure 12 to secure the mount interface 26. In this case, the passages 54 can be seen to be slots oriented in along the track structure 12 thus to allow for lateral adjustment therealong as indicated by arrow B in FIG. 3. The inner support structure 52 may also be provided with other passages as needed, such as those shown at 55a, 55b for power supply access and the like from the wall and through the corresponding passage 57 in the track structure 12 (as shown in FIG. 3) into the housing structure 32.

In some example embodiments, as shown in FIGS. 2 and 8, inner and outer casing structures 58, 60 may be provided to enclose the mount interface 26, at least in part. In this case, the inner casing structure 58 may be sandwiched, or otherwise held, at least in part, between the track structure 12 and the inner support structure 52.

In some example embodiments, the track structure 12 may include a track path 62 to receive, and adjustably position, a head portion 56a (FIG. 8) of each first fastener 56. In this case, the fastener's position may be adjusted along the travel path 62 to target (accommodate) the designated locations of the passages 54 according to the designated position of the luminaire structure 16 on the wall surface 14.

In some example embodiments, as shown in FIGS. 2 and 8, the elongate wall mounting segment 44, elongate supporting segment 46 and/or elongate light source segment 50 may include complementary coupling locations 64 to be coupled in the first mode, and held in place by second fasteners 66. In this case, the second outer casing structure 60 may be configured to cover the coupling locations 64 in the first mode, at least in part.

In some example embodiments, as shown in FIGS. 2 and 8, the elongate supporting segment 46 may be configured to support a light guide 68 in an optical coupling configuration with the light source segment 50. In this case, the elongate light source segment 50 is removable from the elongate support element 46 in the second mode, as seen in FIG. 6.

Figure 7:
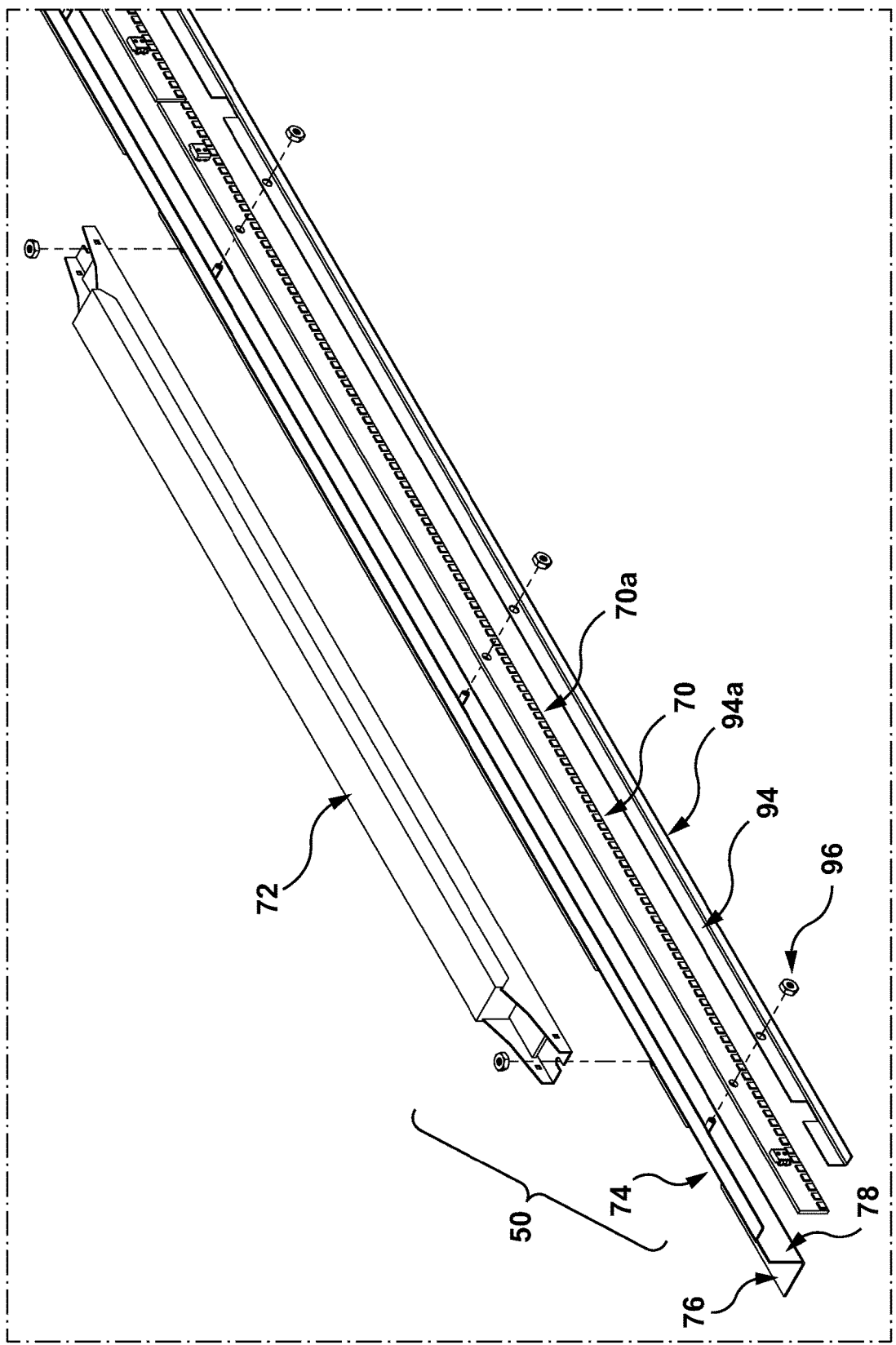
FIG. 7 is a fragmentary assembly view of an elongate light source segment of the luminaire structure of FIG. 6.

Referring to FIGS. 2 and 7, the light source segment 50 may include one or more LED arrays 70 orientable along a longitudinal axis A extending along the light guide 68, along with a power supply shown at 72 for operative coupling to the one or more LED arrays 70. An individual LED is shown at 70a in FIGS. 2 and 8 aligned with a longitudinal light guide boundary of the light guide 68.

Referring to FIGS. 7 and 8, the elongate light source segment 50 may include a light source frame 74 with a first frame portion 76 which is securable to the elongate supporting segment 46 to support the elongate light source segment 50 and to cooperate therewith to define the coupling locations 64, while a second upright frame portion 78 may be configured to releasably support the one or more LED arrays 70 releasably secured thereto.

In some example embodiments, as shown in FIG. 2, the outer casing structure 60 may be held between the elongate wall mounting segment 44 and the elongate supporting segment 46. The outer casing structure 60 may include a pair of opposed longitudinal end regions 60a, 60b, at least one of which may be releasably clipped to the corresponding elongate wall mounting segment 44 and/or the elongate supporting segment 46 for removal therefrom. In this case, the longitudinal end region 60a may be provided with a catch 80a to engage a complementary catch 80b.

In some example embodiments, as shown in FIGS. 3, 4, 7 and 8, the light guide 68 has opposed inner and outer longitudinal light guide boundaries shown generally at 82, 84 and opposed lateral light guide boundaries shown generally at 86, 88. The elongate supporting segment 46 may be provided with a distal end region 90 (FIG. 8) to engage a corresponding the inner longitudinal light guide boundary 82 therein. A light guide clamp member 94 (FIGS. 7 and 8) may also be provided with a corresponding end region 94a to engage and releasably secure an opposite side of the corresponding inner longitudinal light guide boundary 82 relative to the elongate support segment 46. In this case, the light guide clamp member 94 may be releasably secured to the elongate light source segment 50 by way of third fasteners 96.

Figure 4:
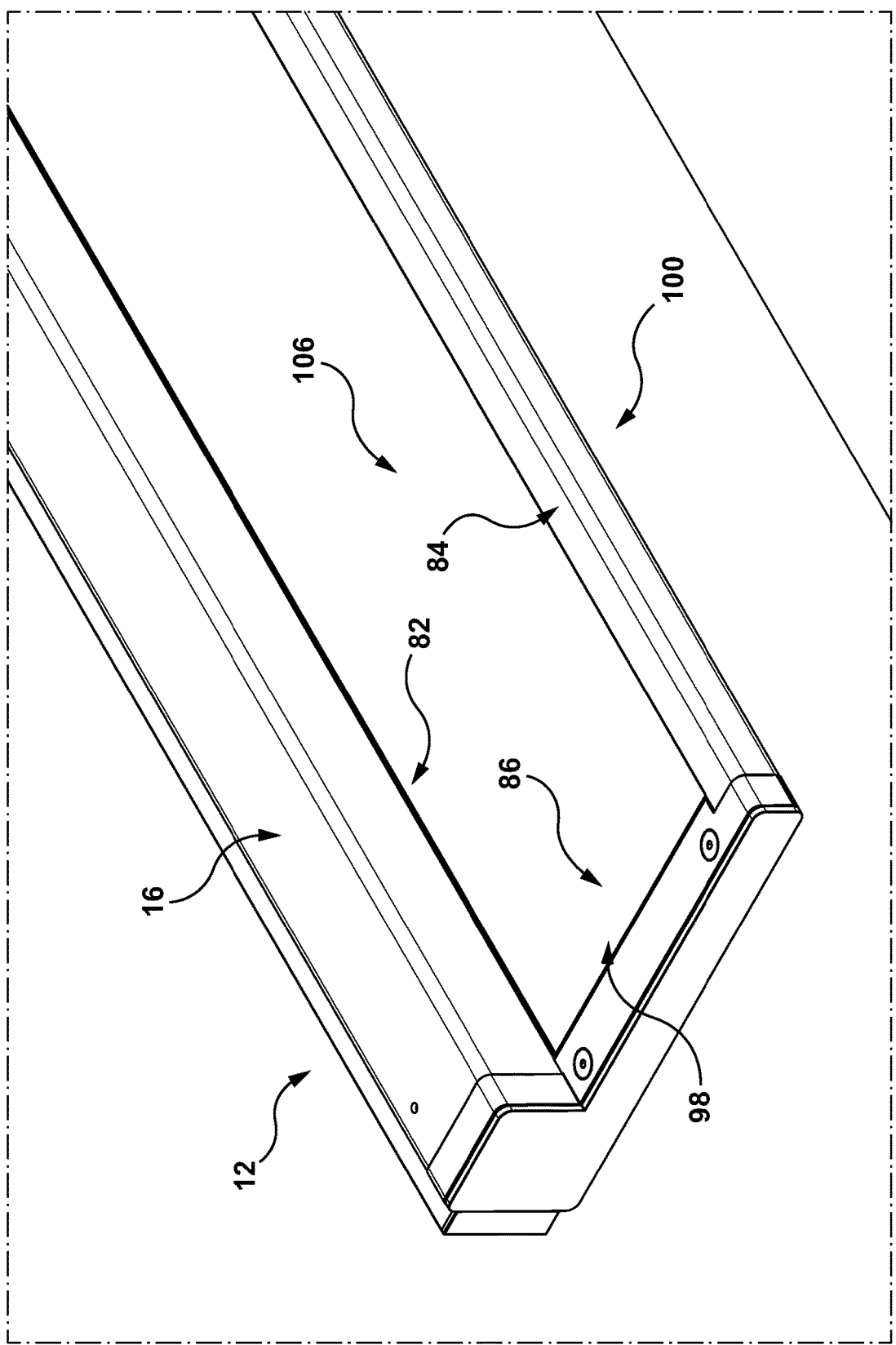

In some example embodiments, as shown in FIGS. 3, 4 and 8, the luminaire structure 16 may further include at least one, in this case a pair of lateral end cap segments 98 to engage a corresponding lateral light guide boundary 86, 88 and, if desired, at least one longitudinal end cap segment 100 to engage the outer longitudinal light guide boundary 84. As shown in FIG. 8, the longitudinal cap segment 100 may be provided with an opening or slot 102 to receive the corresponding longitudinal light guide boundary 84.

In some example embodiments, as shown in FIG. 8, the light guide 68 may be further provided with shielding panels 104*a*, 104*b* to ensure an efficient transmission of light both at the optical coupling 110 and at the inner longitudinal light guide boundary 82 with the LED array 70, and at the outer longitudinal light guide boundary 84. In this case, the clamp member 94 may cooperate with shielding panels 104*a*, 104*b*, to minimize light loss (leakage) at those corresponding locations.

In some example embodiments, as shown in FIGS. 2 and 8, the illumination structure 16 may include a pair of outer panels 106, 108, each at a corresponding outer surface region 38, 40. (For illustrative purposes, the outer panel 106 is shown cut-away in FIG. 2 to expose the light guide 68.) Each outer panel may be held between the lateral end cap segments 98, the longitudinal end cap segment 100, the inner casing structure 58, and/or the outer casing structure 60, in this case by way of a notched coupling as shown at 112. The outer panel 106 may be positioned adjacent the outer casing structure 60 and may be releasable upon release of the outer casing structure 60 by releasing the corresponding catches 80*a* and 80*b*. Alternatively, the outer panel 106 may be removed from the outer casing structure 60 by flexing the outer panel 106 to releasing the outer panel from the notched couplings 112. In some example embodiments, one or both of the outer panels may be provided in the form of lenses, or may provide other configurations to emit light, such as by the way of louvers or the like. The outer panels may also be provided with other decorative or acoustic features, such as by the way of finished surfaces such as perforated surfaces, or be provided with fabric coverings or other acoustic effects.

Figure 9:
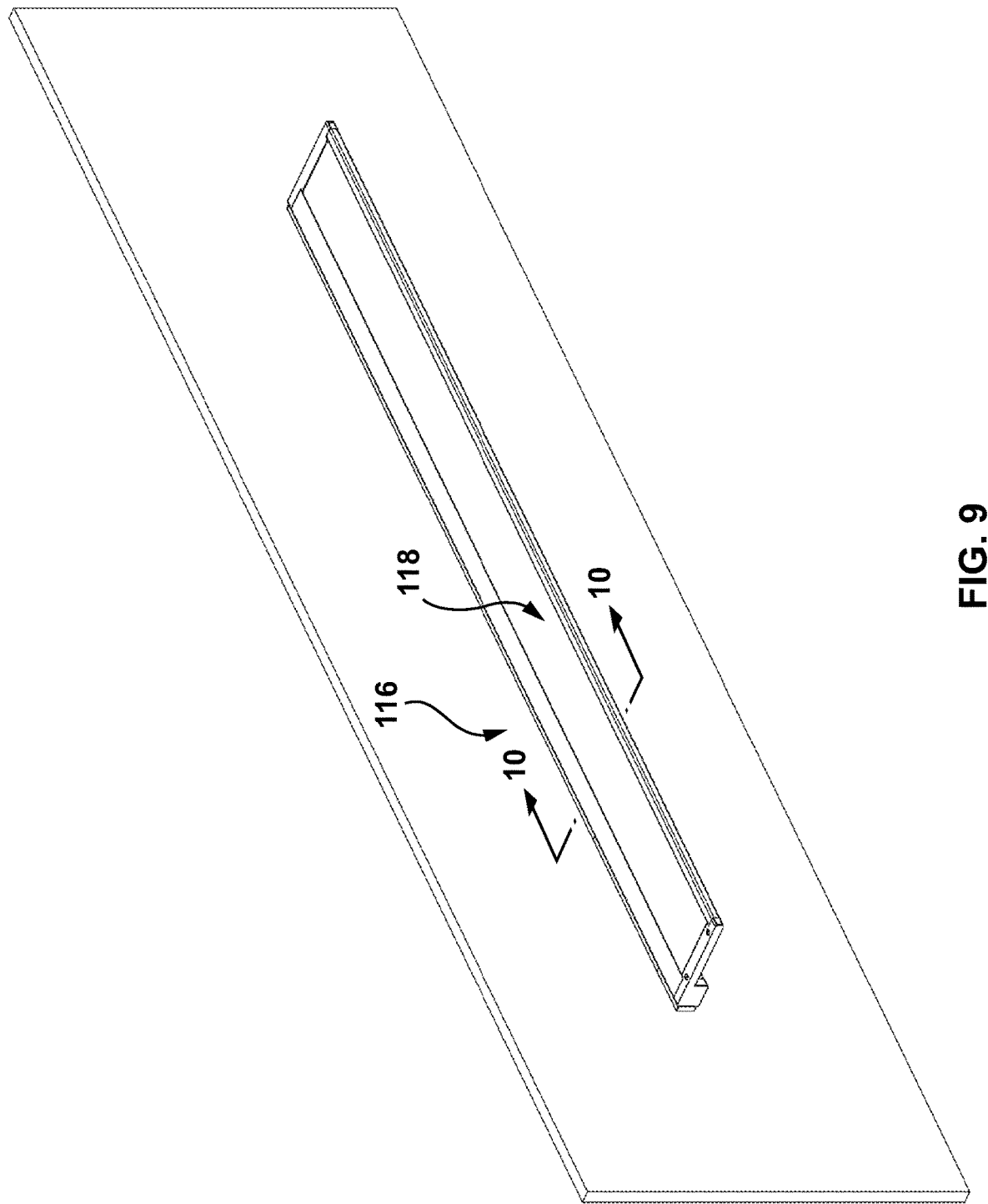
FIG. 9 is a perspective views of another luminaire assembly.
Figure 10:
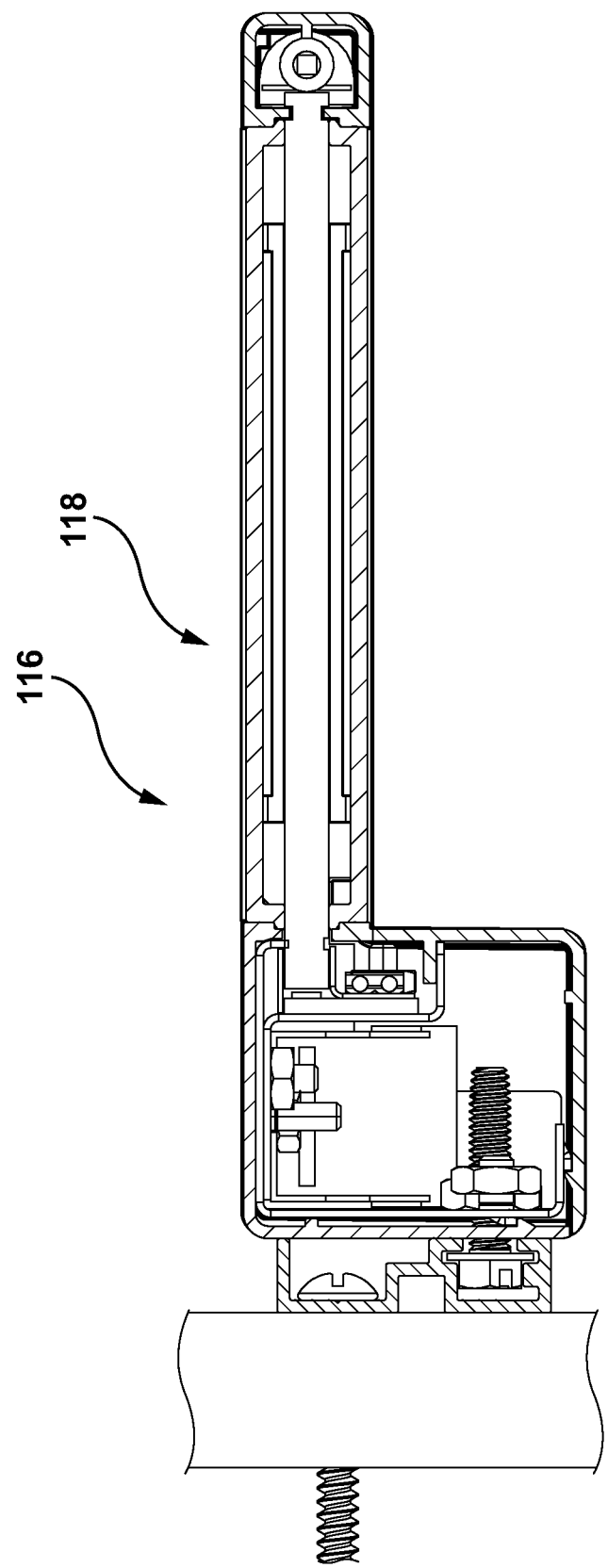
FIG. 10 is a sectional view taken on line 10-10 of FIG. 9.

FIGS. 9 and 10 illustrate another luminaire installation shown at 116 in a reverse configuration to luminaire installation 24, with the in a generally laterally horizontally extending luminaire structure 118.

Figure 11:
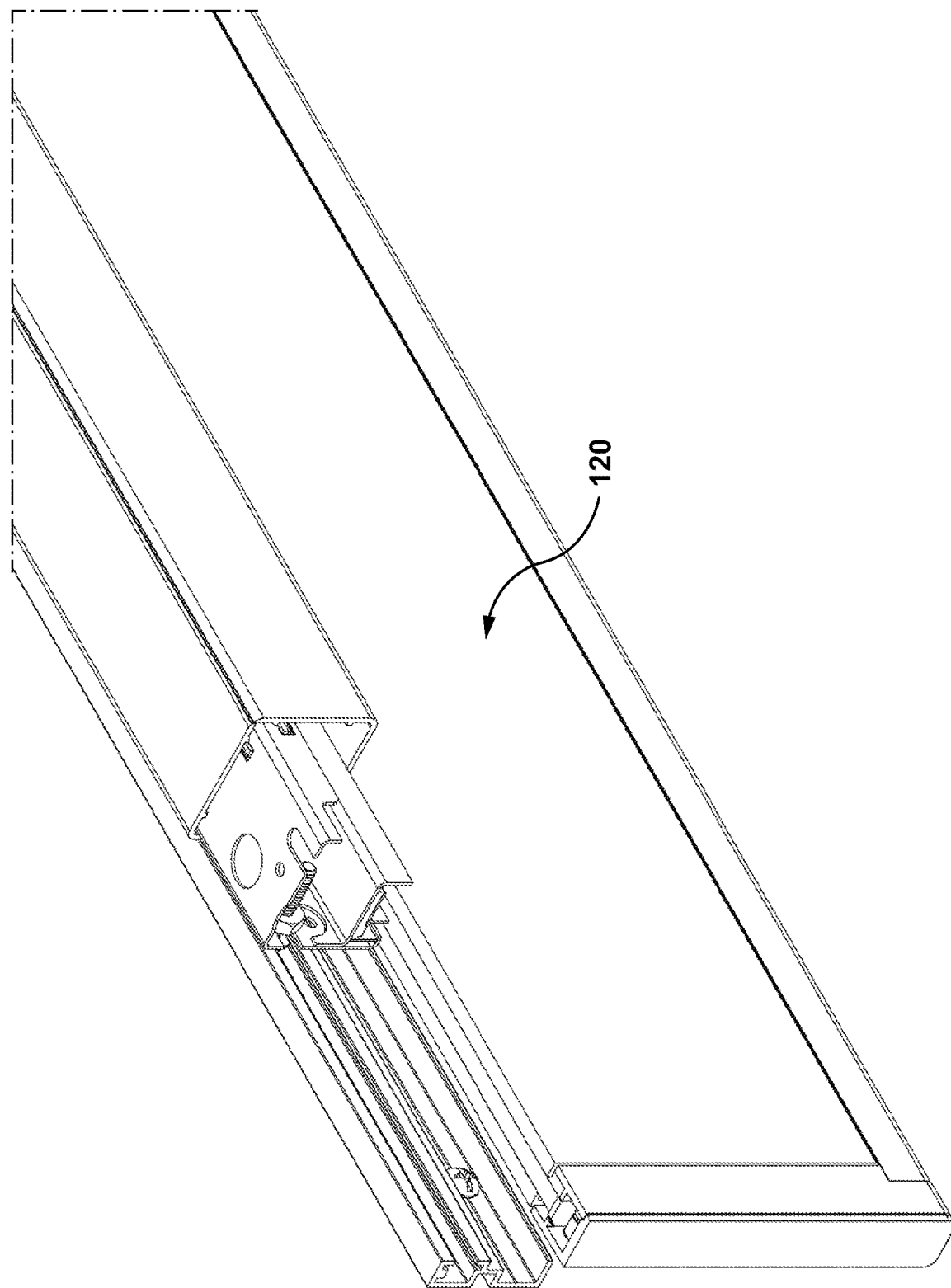
FIGS. 11 and 12 are fragmentary perspective views of luminaire structures in different configurations to those as shown in FIGS. 1 to 6.
Figure 12:
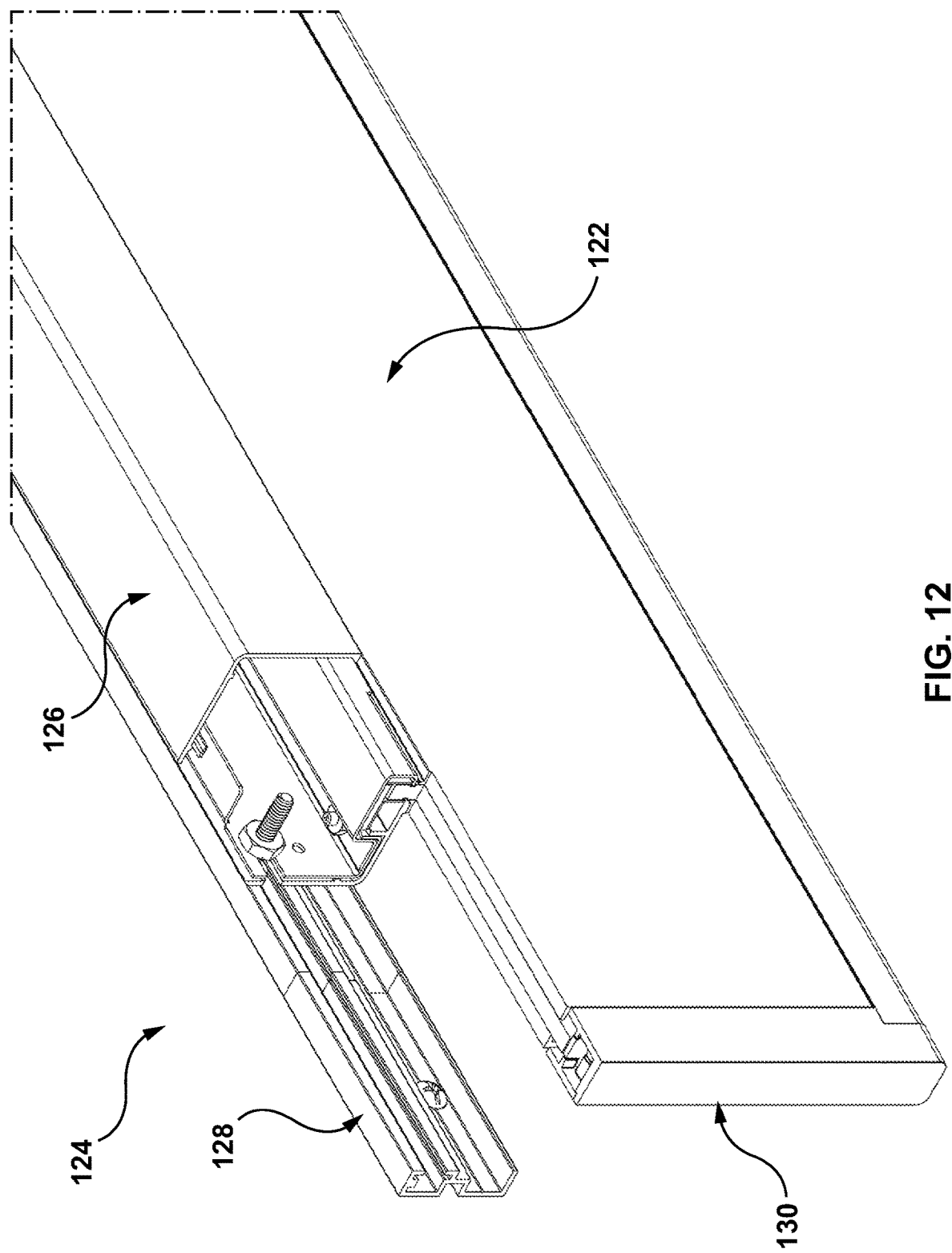
Figure 13:
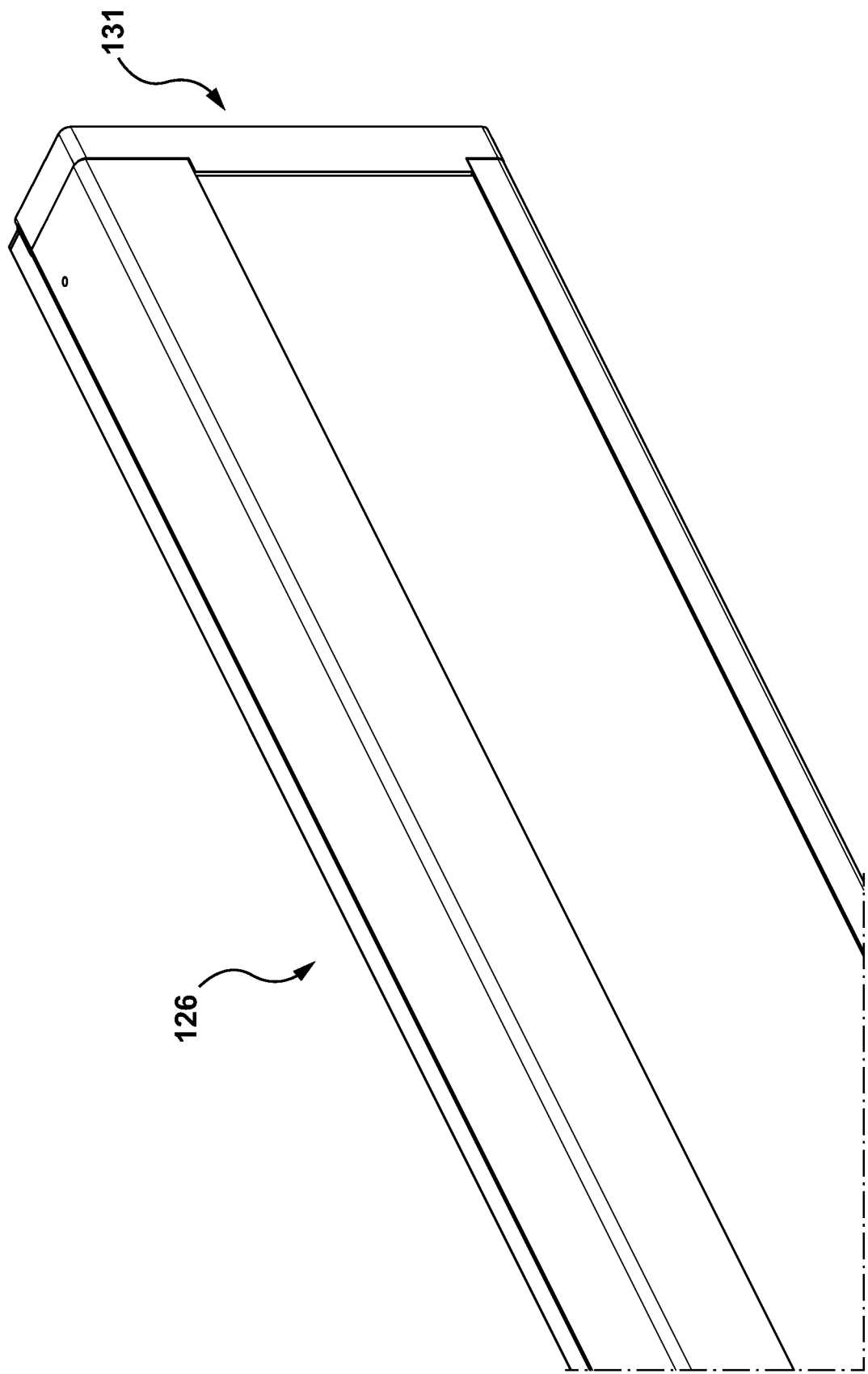
FIGS. 13 to 17 are fragmentary perspective assembly views of the luminaire structure of FIG. 12.

FIGS. 11 to 13 are fragmentary perspective views of other example embodiments of luminaire installations 120 and 122 respectively. The luminaire installation 122 of FIG. 12 includes a luminaire assembly 124 with proximal end region 130 of a luminaire structure 126, and a track structure 128 on a wall surface 130. FIG. 13 shows a distal end region 131 of the luminaire structure 126, while FIGS. 14 to 17 show the disassembly of the luminaire structure 126.

Figure 14:
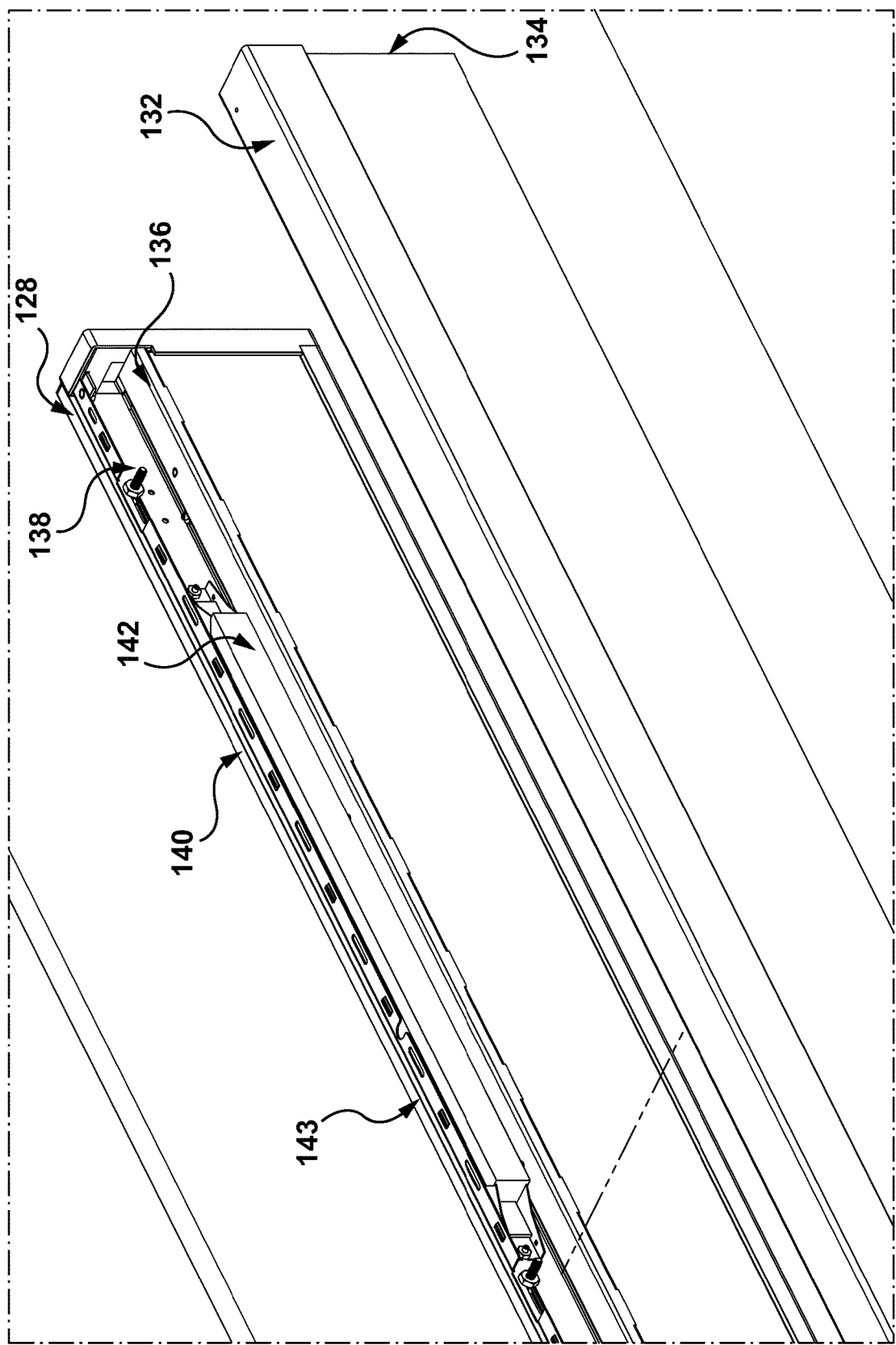
Figure 15:
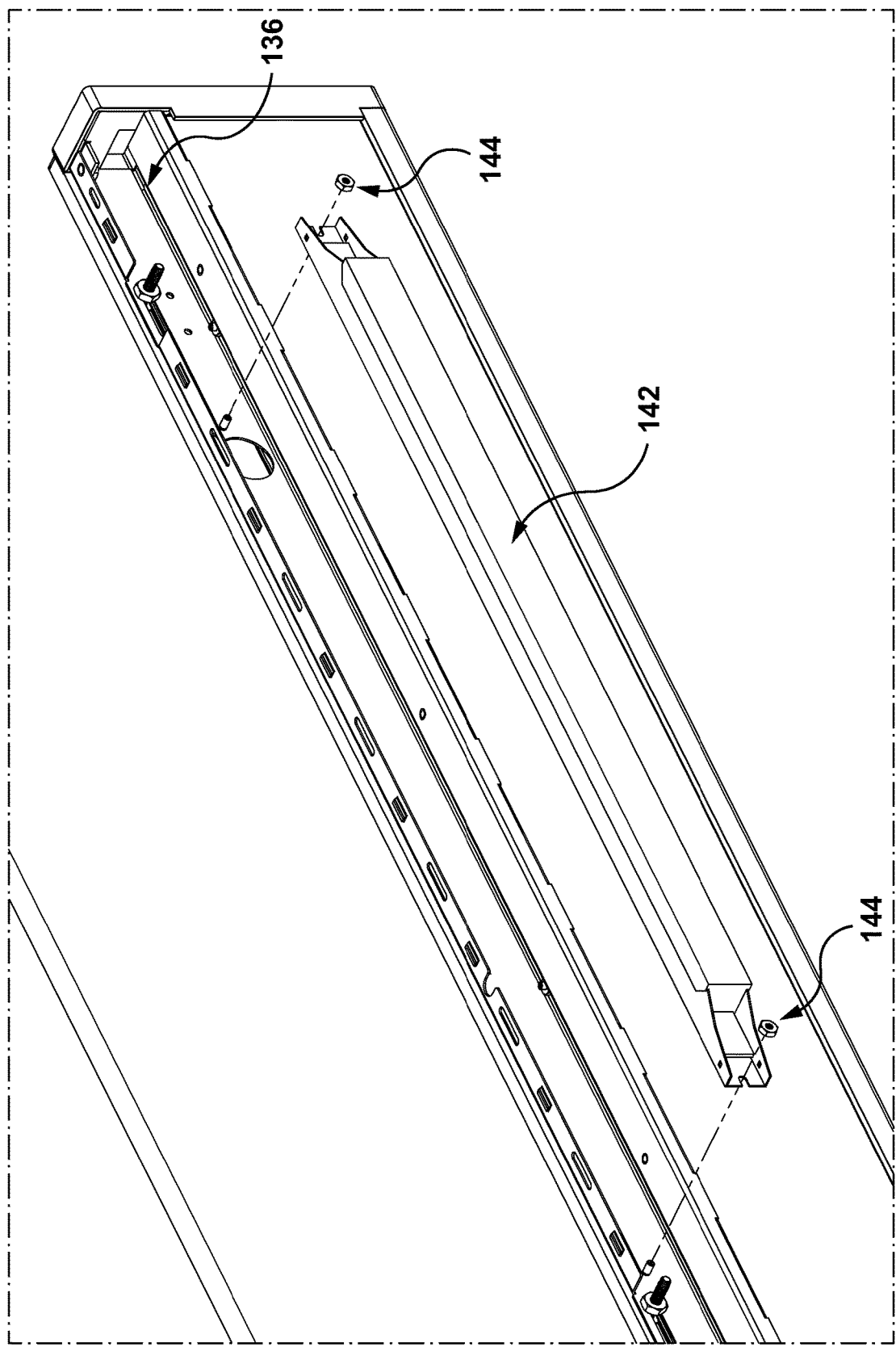
Figure 16:
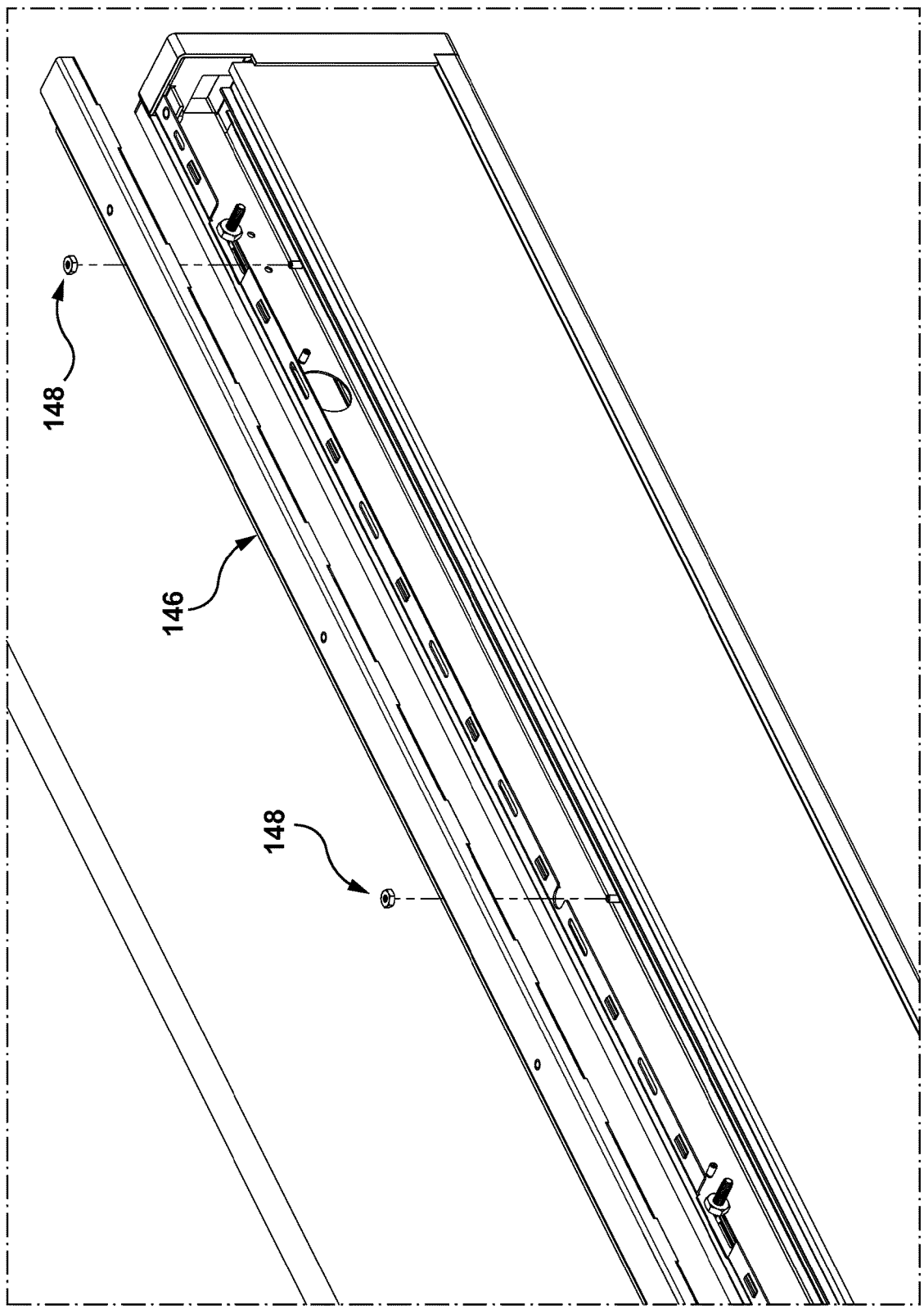
Figure 17:
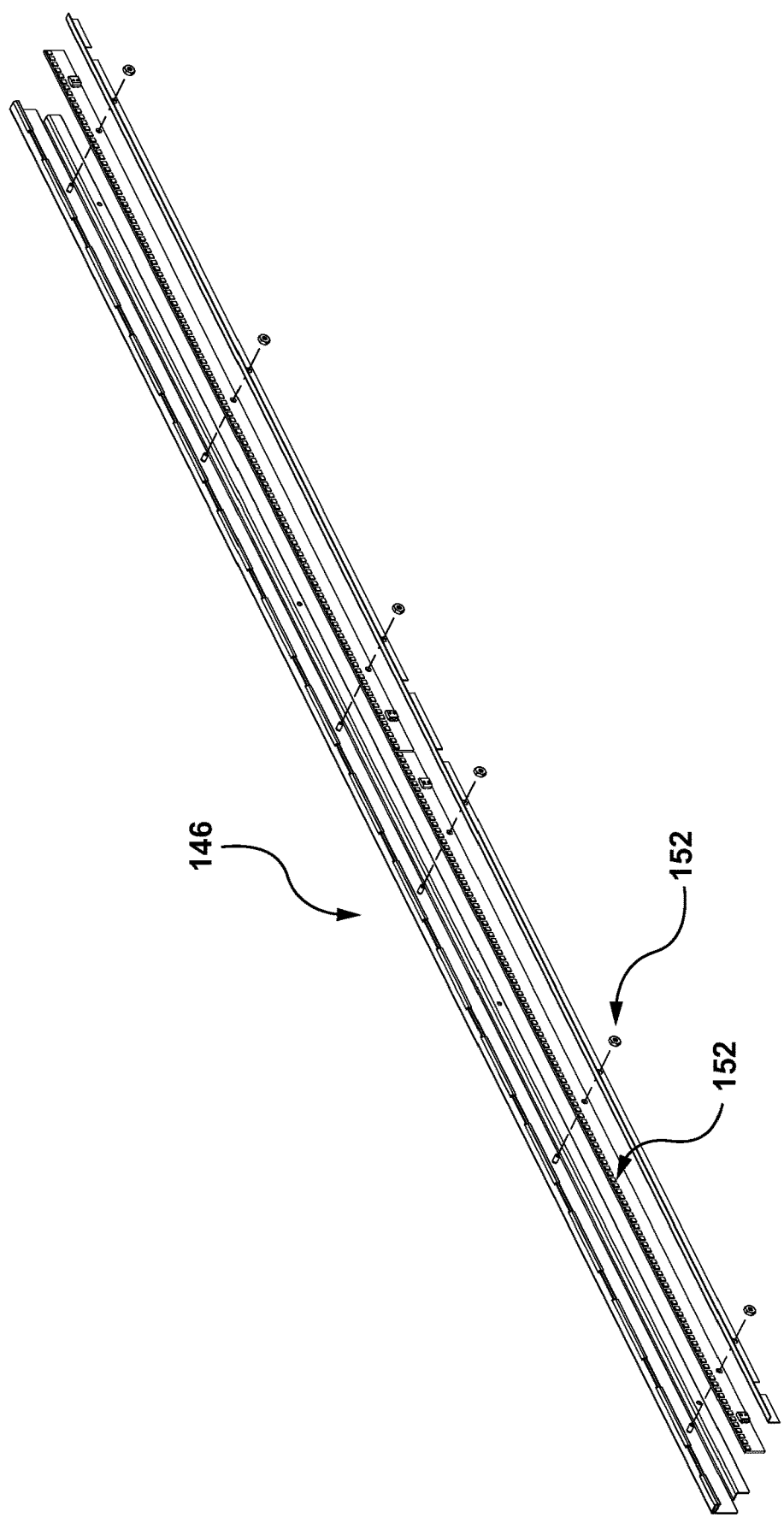

Referring to FIG. 14, the outer casing structure 132 and the outer panel 134 may be removed to reveal the inner support structure 136 and the fasteners 138 holding the inner support structure 136 to the track structure 128. Next, as shown in FIG. 15, the power supply 140 of the elongate light source segment 142 may be removed from the inner support structure 136 by removing fasteners 144. Next as shown in FIG. 16, the light source frame 146 may be removed from the inner support structure 136 by removal of fasteners 148, and in FIG. 17, the LED array 150 may be removed from the light source frame 146 by way of fasteners 152, thus allowing servicing of the elongate light source segment 142 and the LED array 150, as well as the other structures and components revealed by the removal of the cover segment outer casing structure 132 and the outer panel 134, while the inner support structure 136 remains fastened to the track structure 128. In some cases such as this case, the power supply 140 may be removed to gain access to the fasteners 148.

Figure 18:
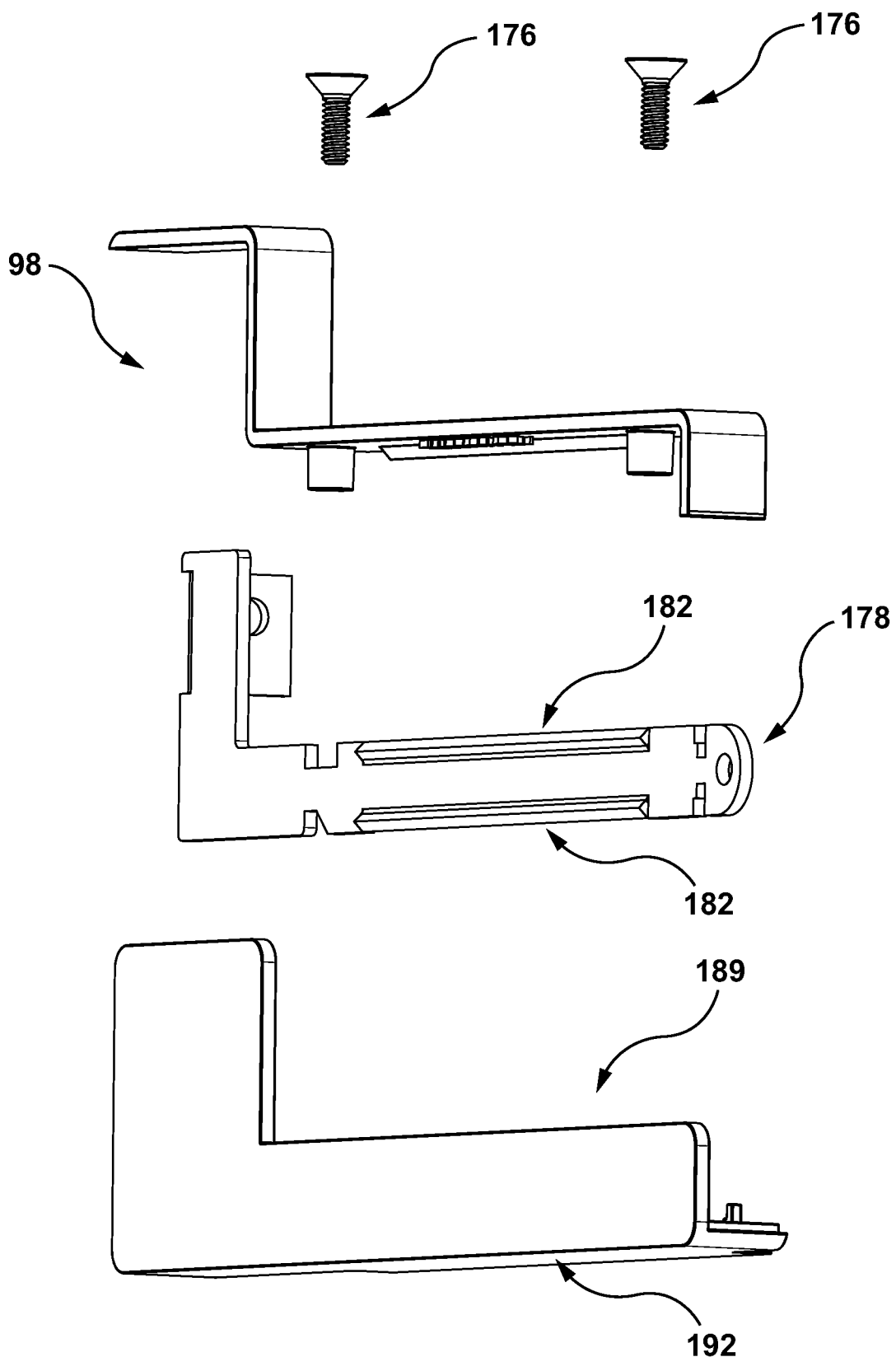
FIGS. 18 and 19 are perspective assembly views of a lateral end cap segment of the luminaire assembly of FIG. 4.
Figure 19:
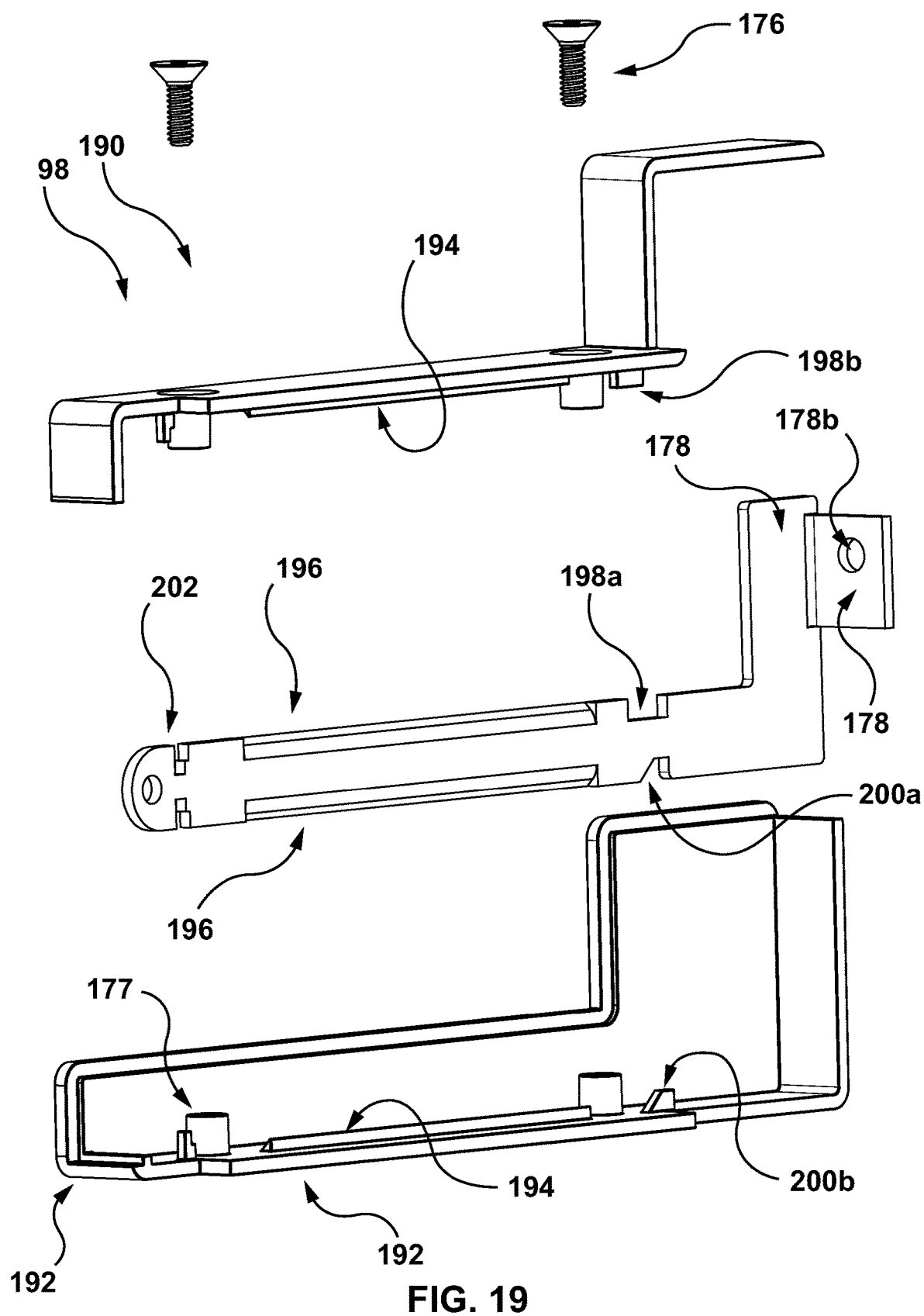

In some example embodiments, as shown in FIGS. 1 and 2, the luminaire assembly 10 is shown to include two luminaire structures 16, with the opposed outer surface regions 38, 40 defined on outer panels 106, 108. FIGS. 18 and 19 show further details of the lateral end cap segment 98, which, as will be described, may be configured to clamp, or otherwise hold, outer panels 106 and 108 and/or the light guide 68 (FIG. 8), or to close the outer cross section of the luminaire structure 16, so as to conceal the support arm 178 and the associated fasteners and the like.

Figure 20:
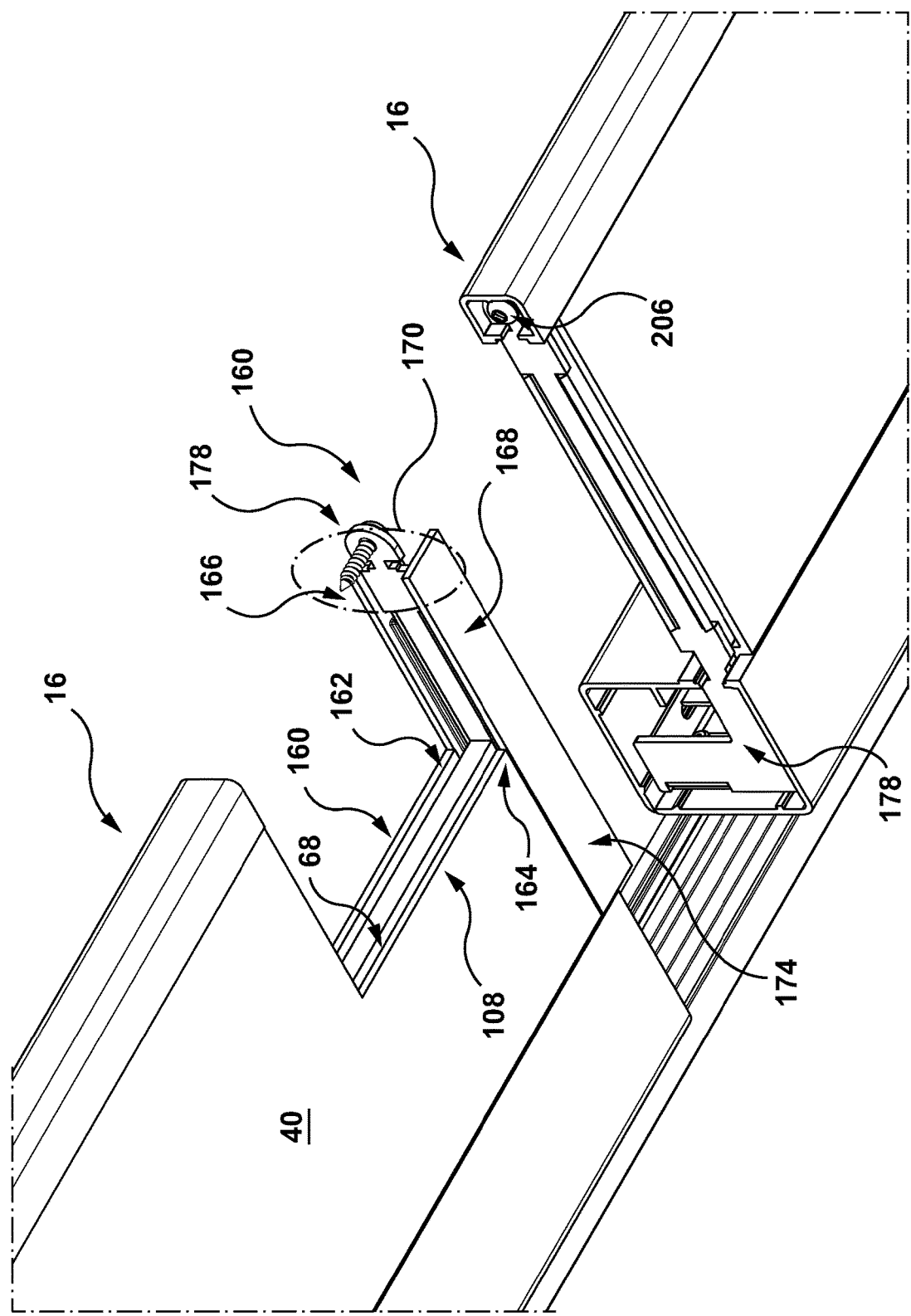
Figure 21:
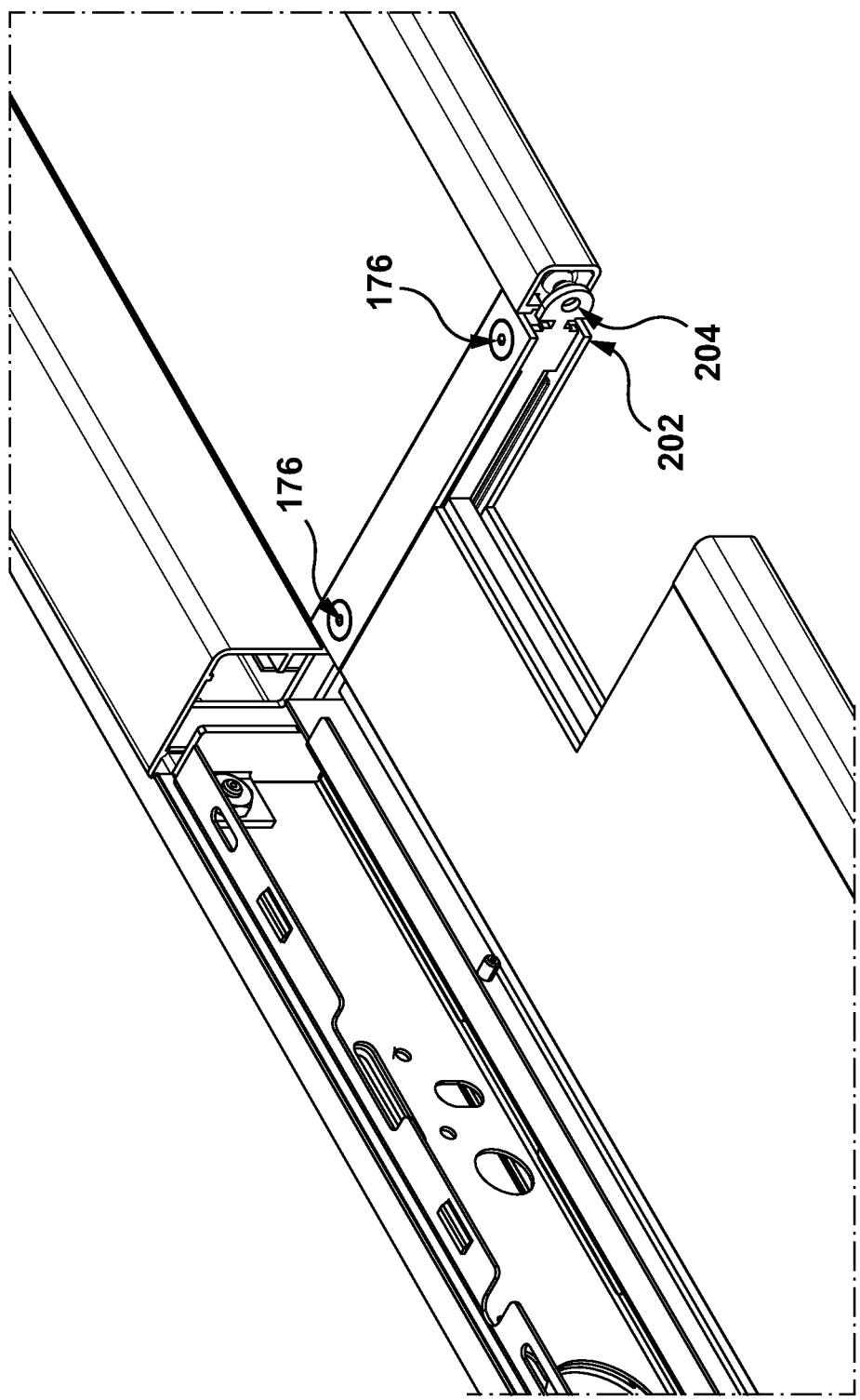
Figure 21A:
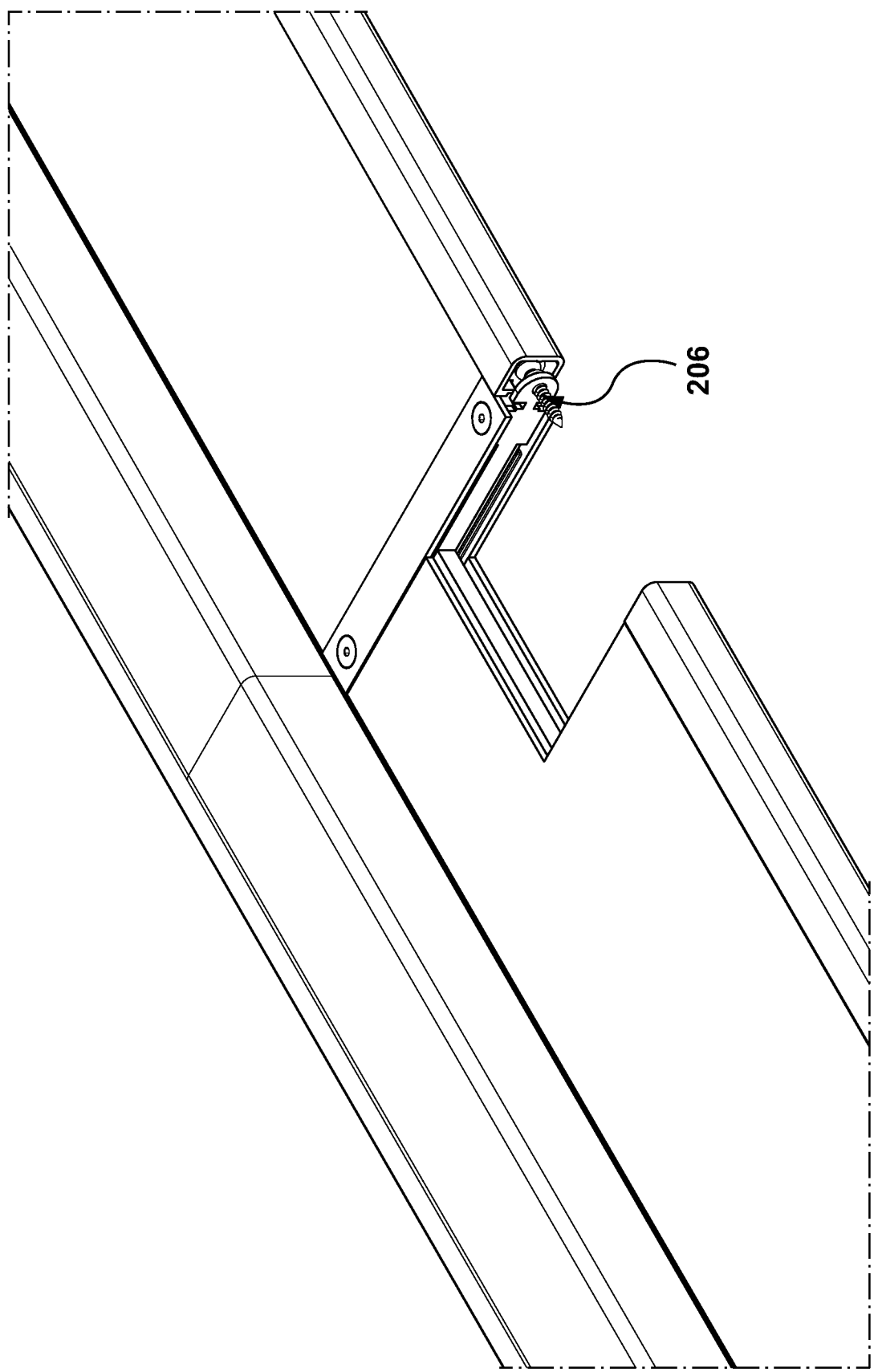

In some example embodiments, as shown in FIG. 20, each of the outer panels 106, 108 has a lateral edge which terminates at an adjacent lateral end region 162, 164. Also provided is a clamp assembly shown at 160 for engaging the adjacent lateral end regions 162, 164 to providing an aligning interface 170. The clamp assembly may provide a pair of outer surfaces 166, 168 which may be configured to be substantially coplanar with the outer surface regions 38, 40 of the outer panels 106, 108 at the aligning interface 170 (FIGS. 21 and 21*a*).

In some example embodiments, as seen in FIGS. 20 to 23, the clamp assembly may include a pair of clamp elements 172, 174 to extend along opposite outer boundaries of the luminaire structures 16, and are configured to be drawn to one another to form the aligning interface 170, by way of fasteners 176, to extend through the upper of the clamp elements 172 and be each received in corresponding receptors 177.

In some example embodiments, along each lateral edge region of the respective luminaire structure 16, a support arm 178 may extend therealong between the housing structure and the distal end region, and configured to engage each of the mating clamp elements 172, 174 in the aligning interface 170. In this case, the support arm 178 may be provided with a proximal end region 178*a* which extends into the housing structure 32 through the spacing between the distal end region 90 of the elongate supporting segment 46 and the outer casing structure 60. Referring to FIG. 19, the support arms 78 may be provided with an anchoring flange 178*a* extending longitudinally relative to the axis A with a passage 178*b* to be held by one of the first fasteners 56. Other configurations may be provided to secure the support arm to the housing structure, or to the track structure, if desired.

Figure 22:
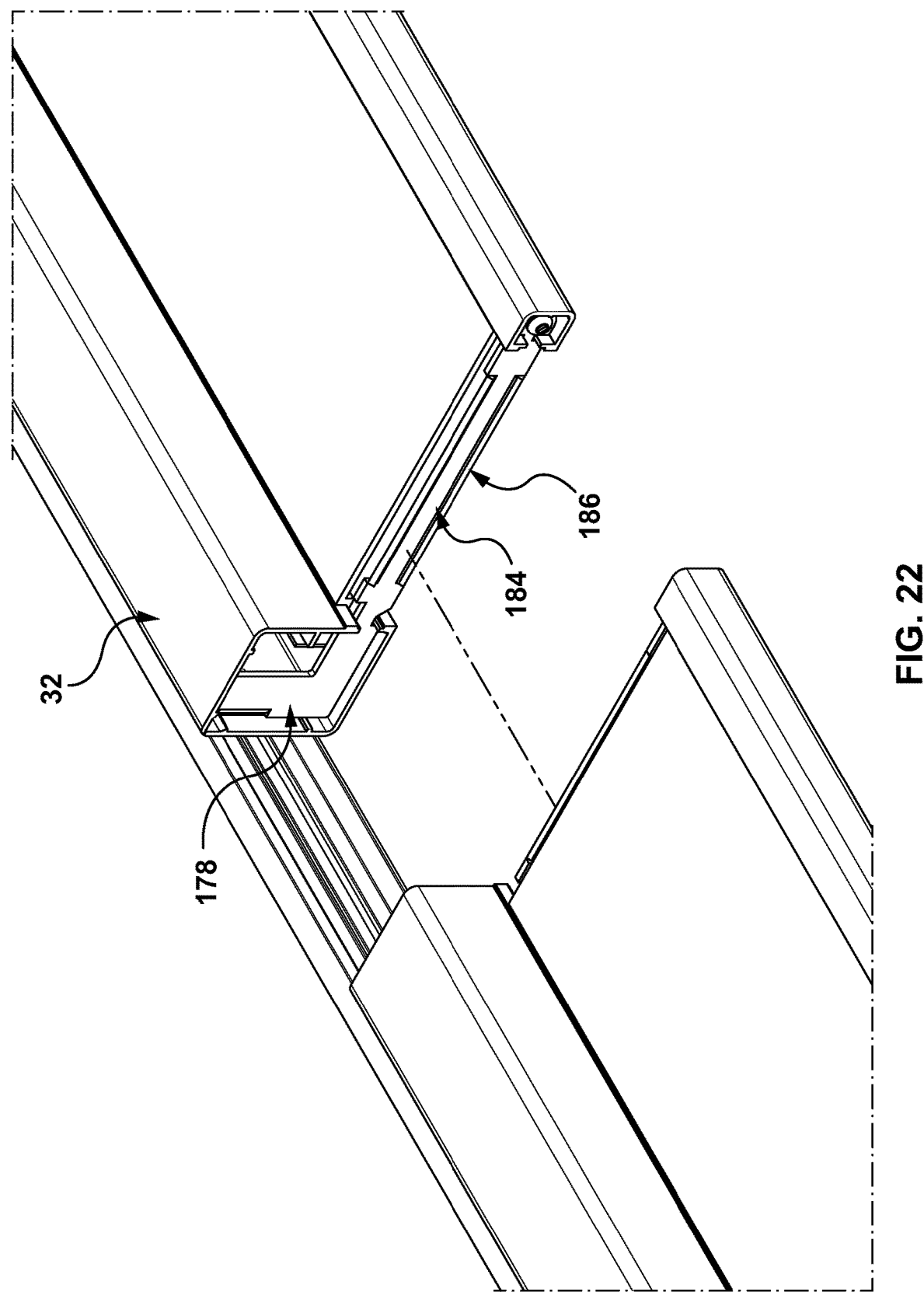

In some example embodiments, as shown in FIGS. 22, 23, each clamp element 172, 174 may include a pair of opposed first locking formations 180, 182 extending along opposite sides thereof, and each support arm includes a pair of opposed second locking formations 184, 186 along opposite sides thereof, wherein each of the first locking formations 180, 182 engages a corresponding second formation 184, 186.

Figure 26:
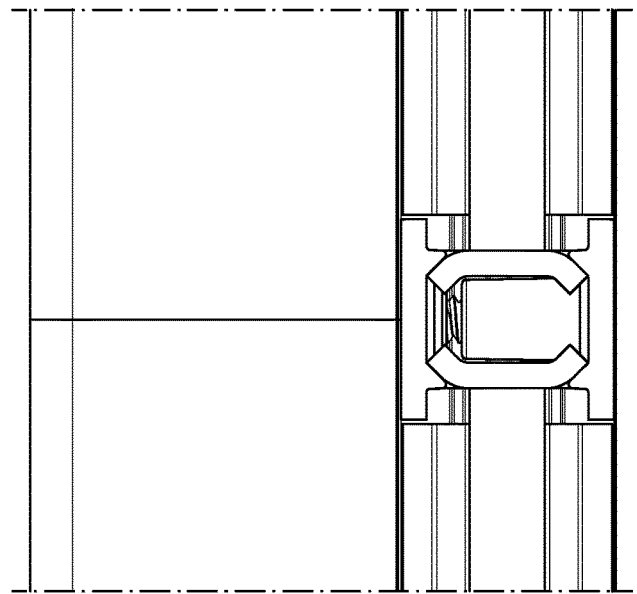
Figure 25:
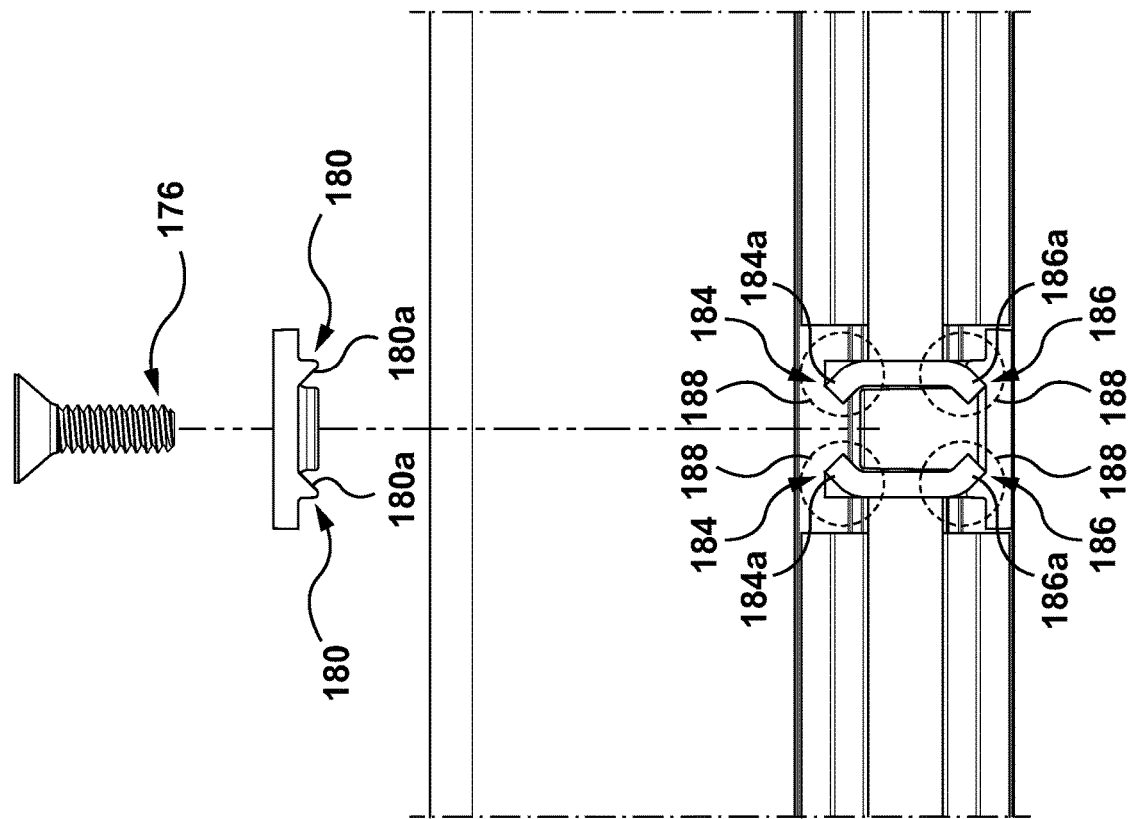
Figure 27:
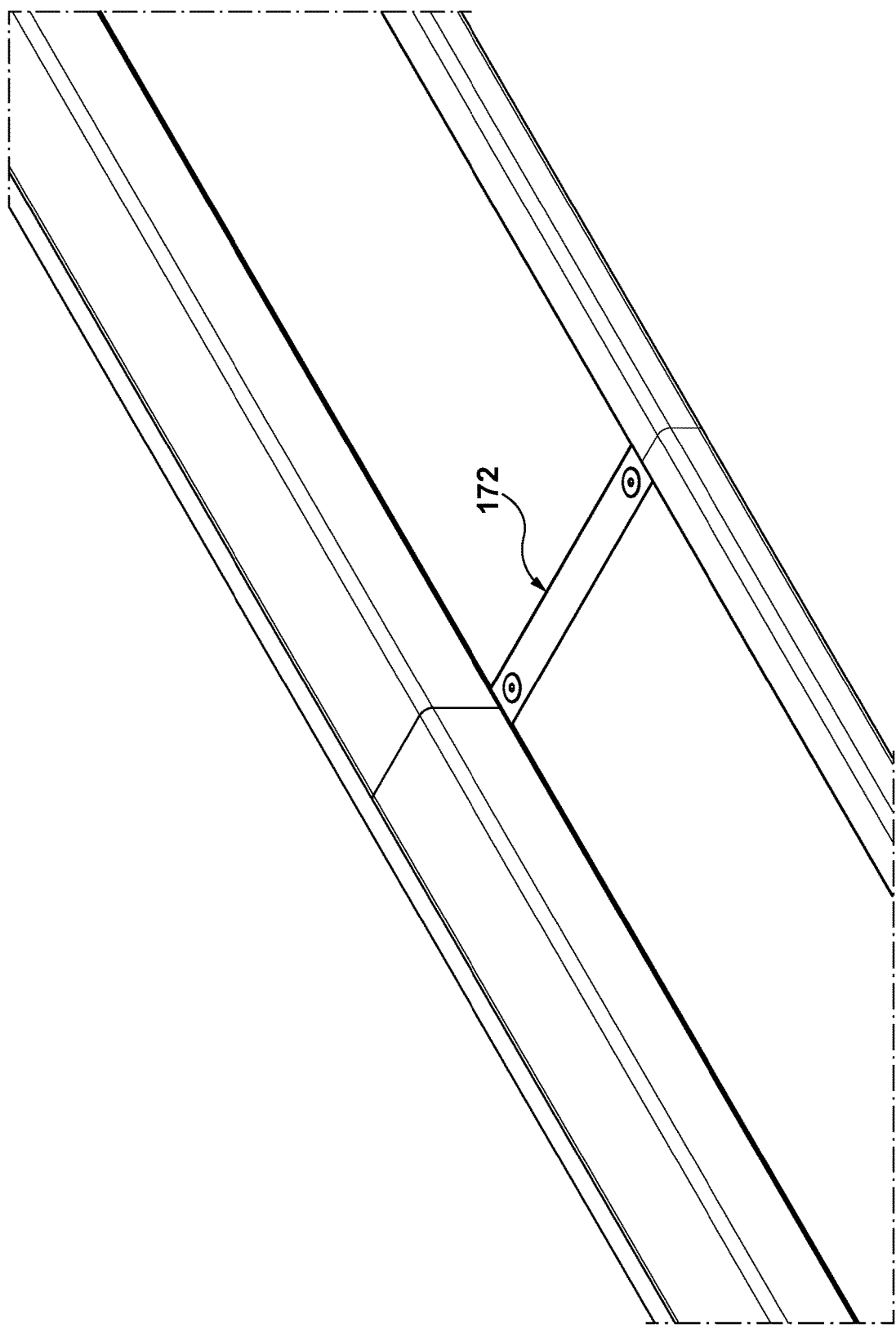
Figure 28:
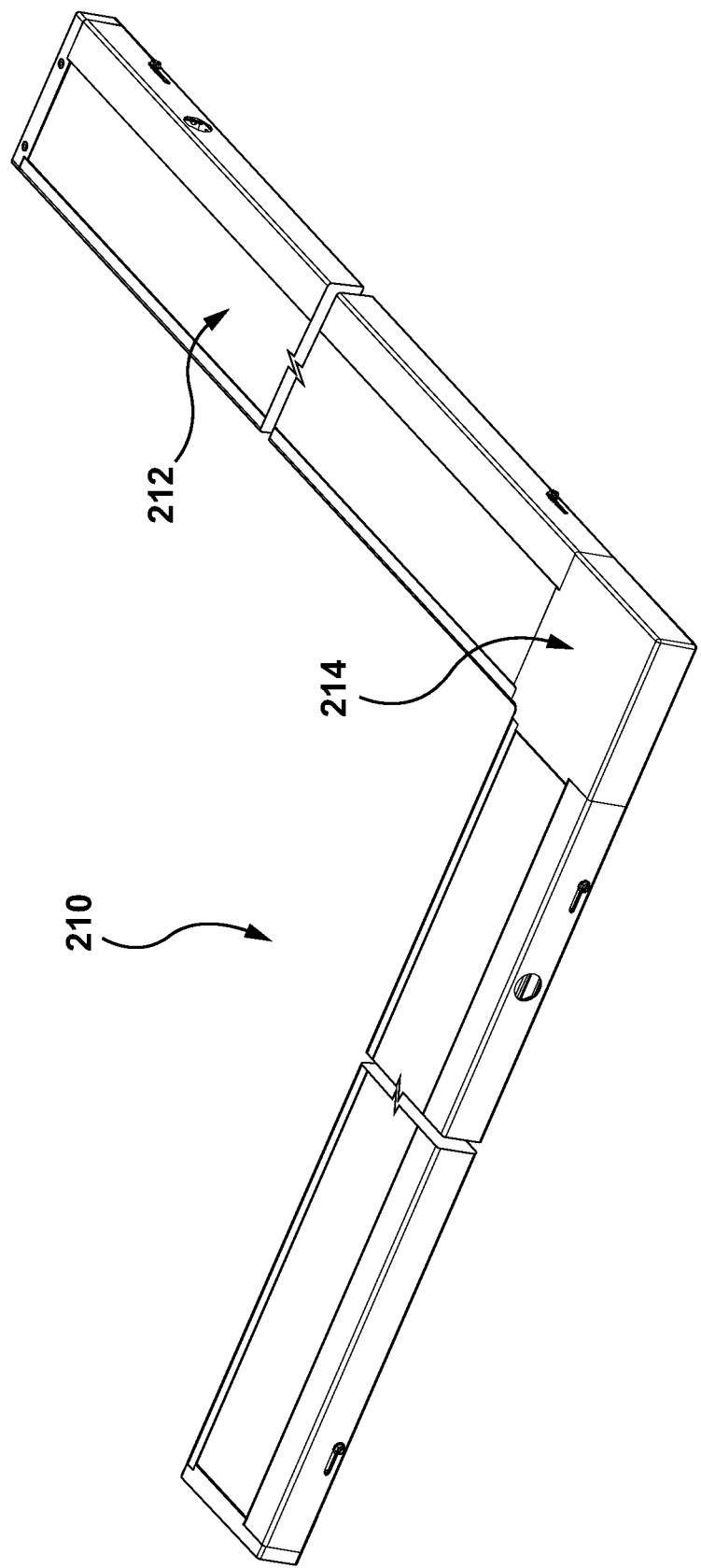
FIG. 28 is a perspective view as viewed from above of another luminaire assembly, forming a right angle configuration.

Referring to FIGS. 25 and 26, the first locking formations 180, 182 can be seen to provide inwardly inwardly facing inclined surfaces 180*a*, 182*a*, which engage with outwardly facing inclined faces 184*a*, 186*a*, as can been in FIG. 25, to form a plurality, in this case four clamping interfaces 188. Thus, the tightening of the fasteners 176 into the receptors 177 may thus have the effect of drawing each of the luminaire structures toward the clamping interfaces 188 to form a unitary luminaire assembly, while providing a clean and substantially continuous surface presentation across the clamping interfaces, as shown in FIGS. 25 to 27.

In some example embodiments, as shown in FIGS. 18 and 19, each lateral end cap segment 98 may be configured to provide the clamp interfaces in connection with a single support arm 178. In this case, the lateral end clamp segment may be provided with lateral end cap elements 190 and 192, each with a corresponding locking formation 194 to engage a corresponding second locking formation 196 of the pair provided on the support arm 178. Further, the lateral end cap segments may provide a provide other locking interfaces with the support arm 178 by way of notches 198a and posts 198b formed in the support arm 178 and the upper end cap element 190 and, if desired, a different set of notches 200a and posts 200b formed in the support arm 178 and the lower end cap element 192 for lateral locking alignment.

In another example embodiment, as seen in FIGS. 8, 20, and 21, each of the support arms 178 may provide a set of notches 202 to receive corresponding ends of the longitudinal end cap segment 100, in other words so that the support arm may fit through the opening 102, so as to positively locate the longitudinal end cap segment 100 with the lateral end cap segment 98 to form another pair of notched couplings 112. Passages 204 may be further provided to receive fasteners 206 to thread into receptors 208 in the longitudinal end cap segment 100. These locking configurations may provide, in some example embodiments, a means by which the luminaire assembly may present substantially unitary and/or continuous surfaces along the length of the luminaire assembly 10, while enabling the housing structure 32 and the track structure 12 to accommodate any planar variations in the wall surface.

In another example embodiment, as seen in FIGS. 28 to 35, a luminaire assembly is shown at 210 having a pair of luminaire structures 212 joined at a corner segment 214. In this case, the corner segment 214 may be provided with locking formations, notches and/or posts as used with the end cap segment 98, or other structures, to couple the luminaire structures 212 thereto.

The subject matter herein includes any of the present figures, or new figures based on the present figures and the present application sheets herein, with one or more such features shown in broken lines. Thus, any change of such one or more solid lines to one or more solid lines, is not new matter.

The example embodiments of FIGS. 28 to 31 are shown with symbolic break lines, to illustrate variable length to illustrate indefinite length, width and depth. The appearance of any portion between the break lines forms no part of the claimed design. A separation is used to indicate that, for ease of illustration, the specific dimension of the article associated with the separation, and is to be broadly interpreted. The subject matter herein includes any of the present figures with such symbolic break lines removed and the ranges of dimensions that the symbolic break lines represent. Thus, any removal or addition of any one or more of such symbolic break lines is not new matter.

Figure 29:
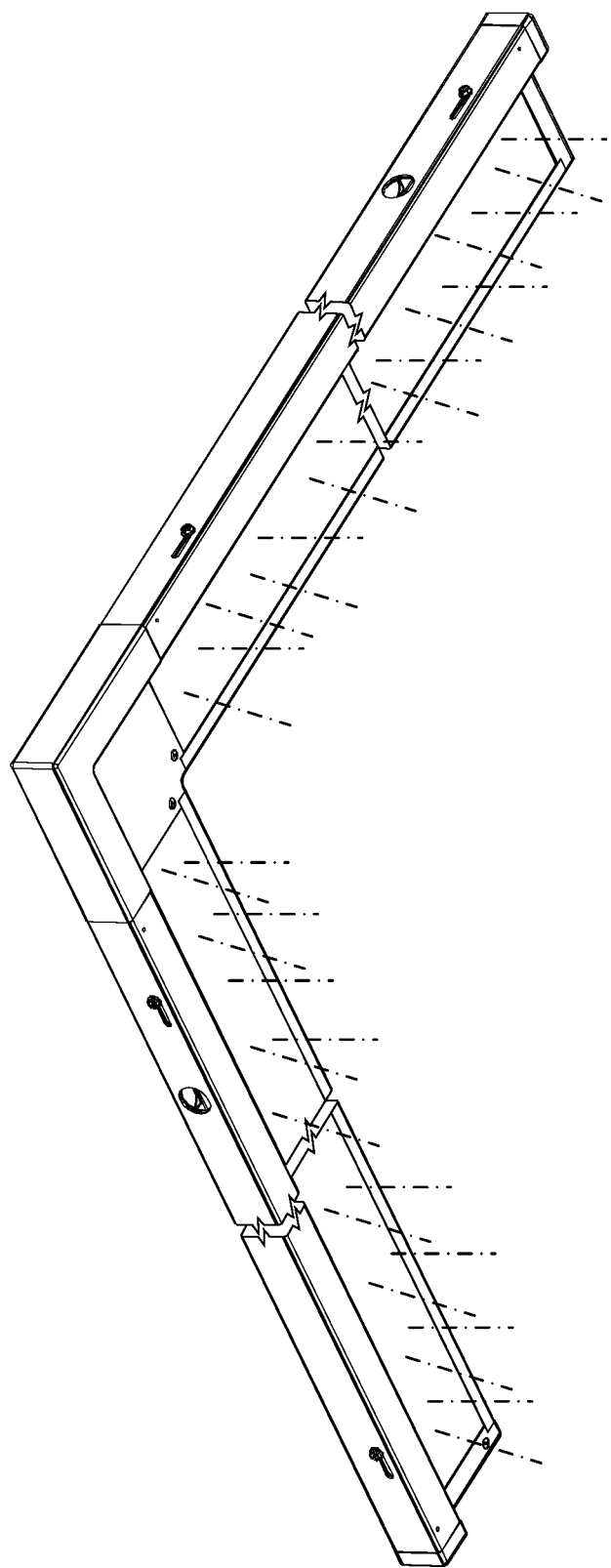
FIG. 29 is a perspective view as viewed from below of the luminaire assembly of FIG. 28, showing the luminaire assembly in an illuminated condition.
Figure 30:
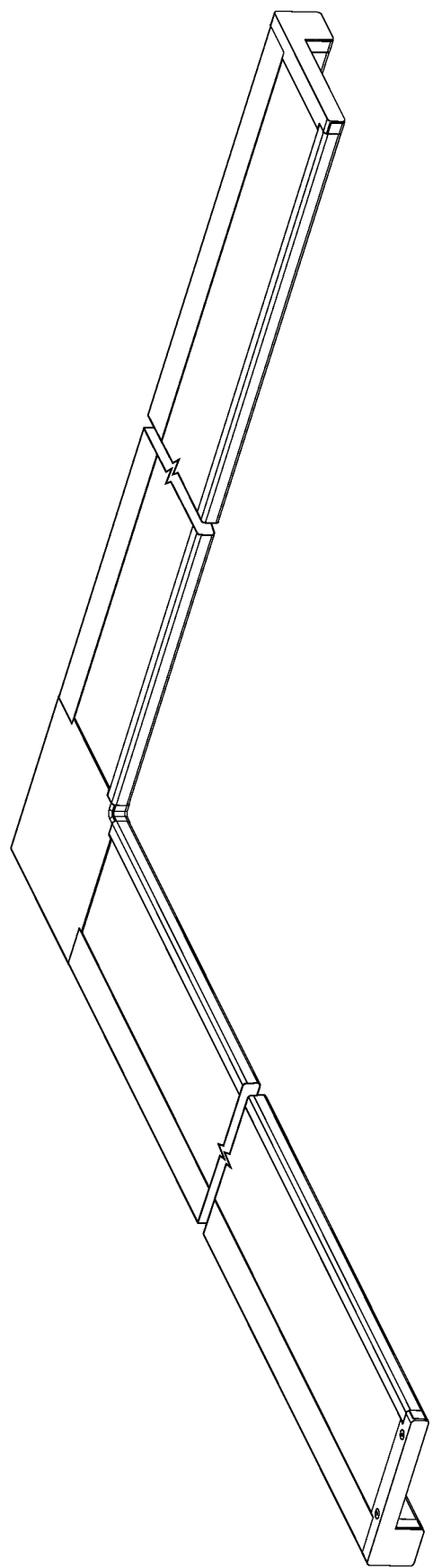
FIG. 30 is a perspective view as viewed from above of the luminaire assembly of FIG. 28.
Figure 31:
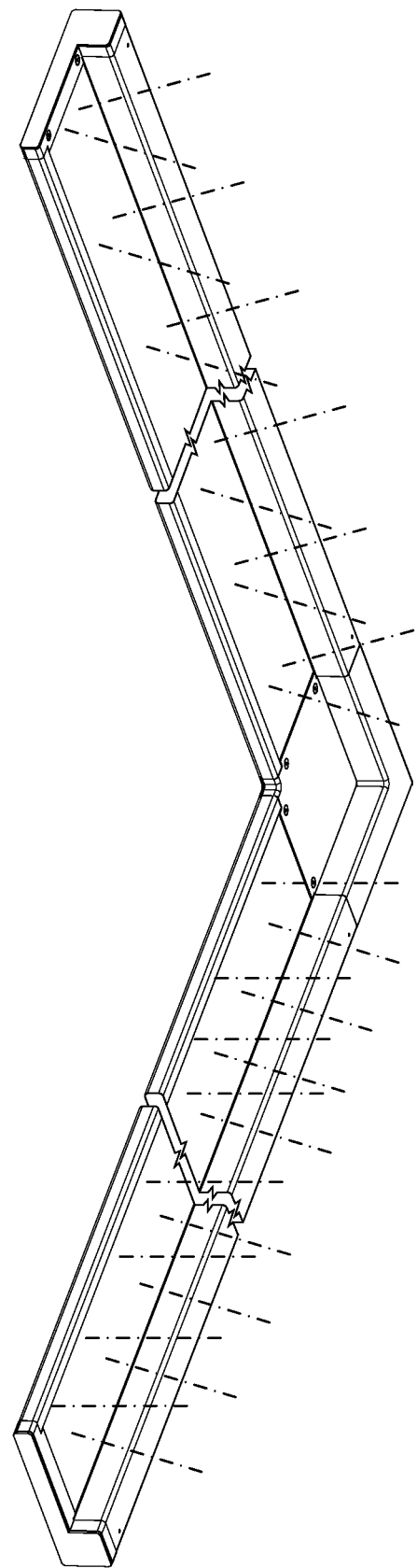
FIG. 31 is a perspective view as viewed from below of the luminaire assembly of FIG. 28, showing the luminaire assembly in an illuminated condition.
Figure 32:
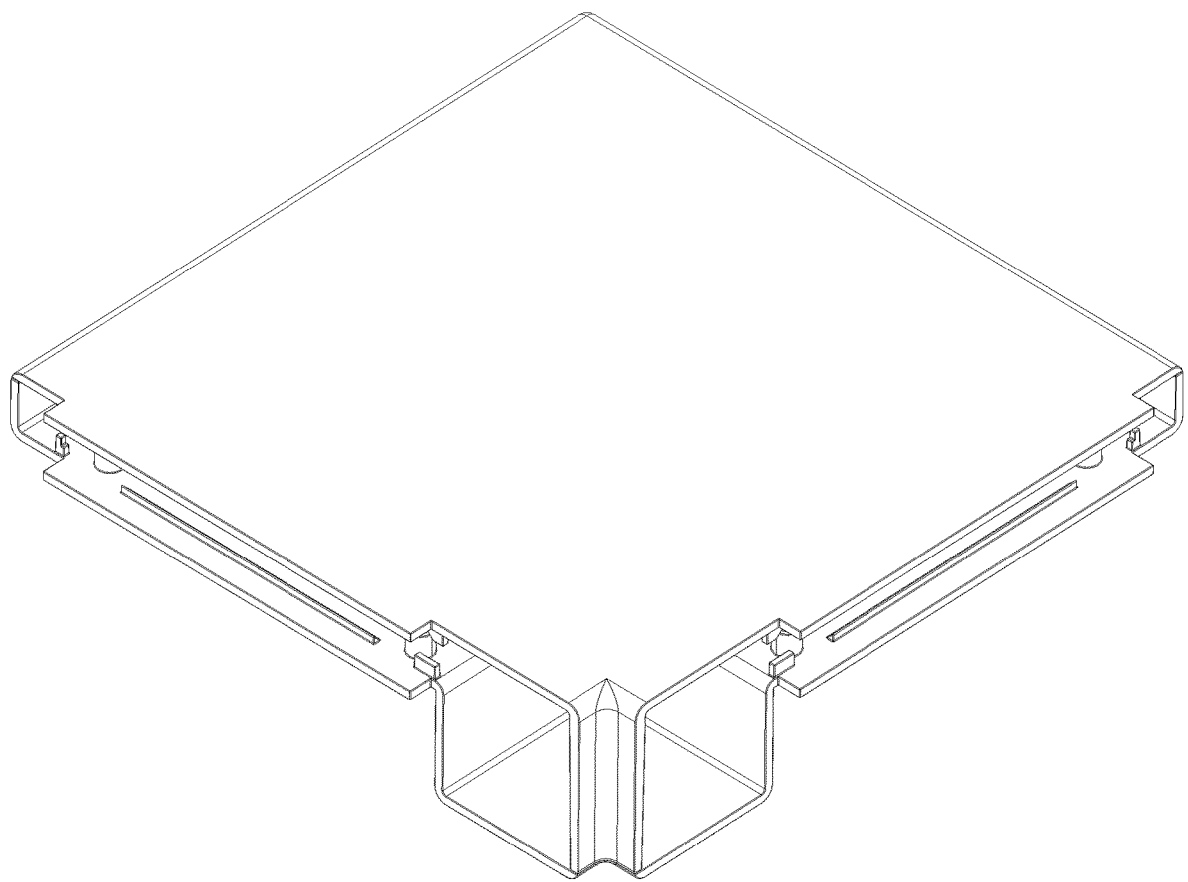
FIGS. 32 to 35 are perspective views of a corner segment of the luminaire assembly of FIG. 28.
Figure 33:
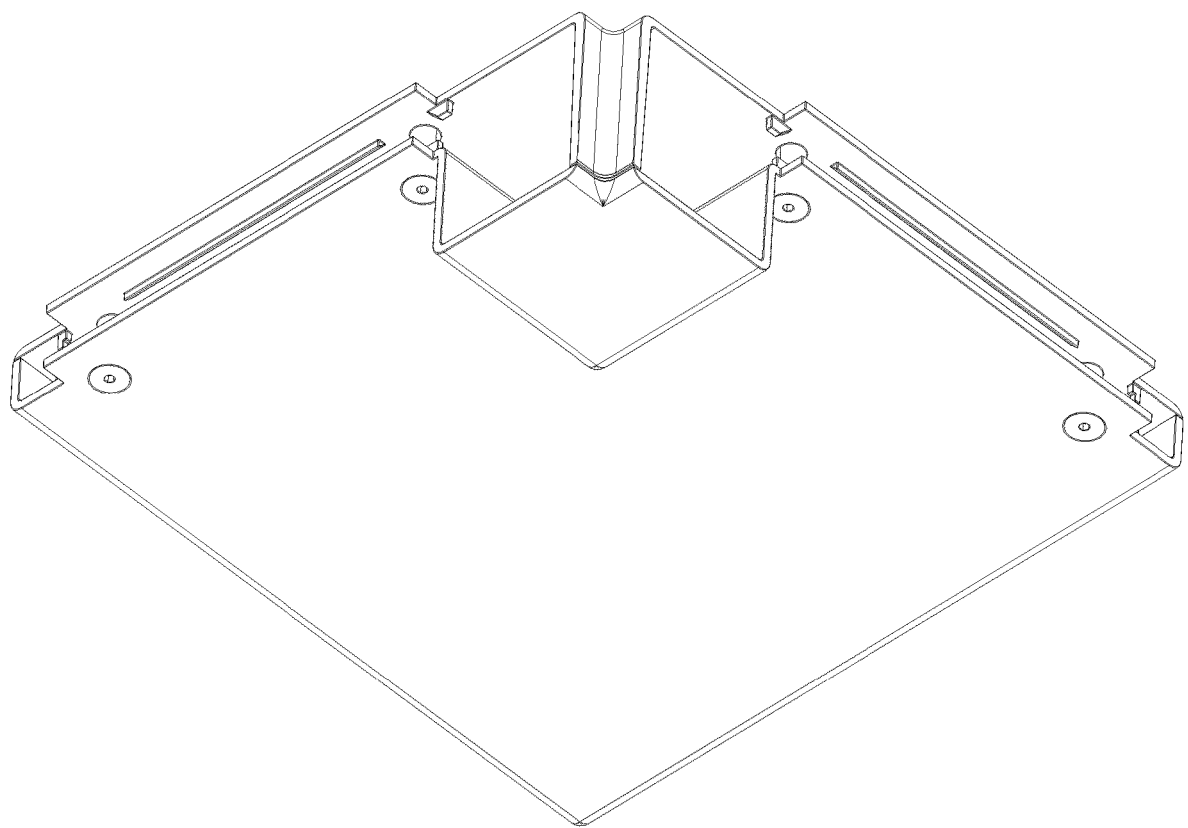
Figure 34:
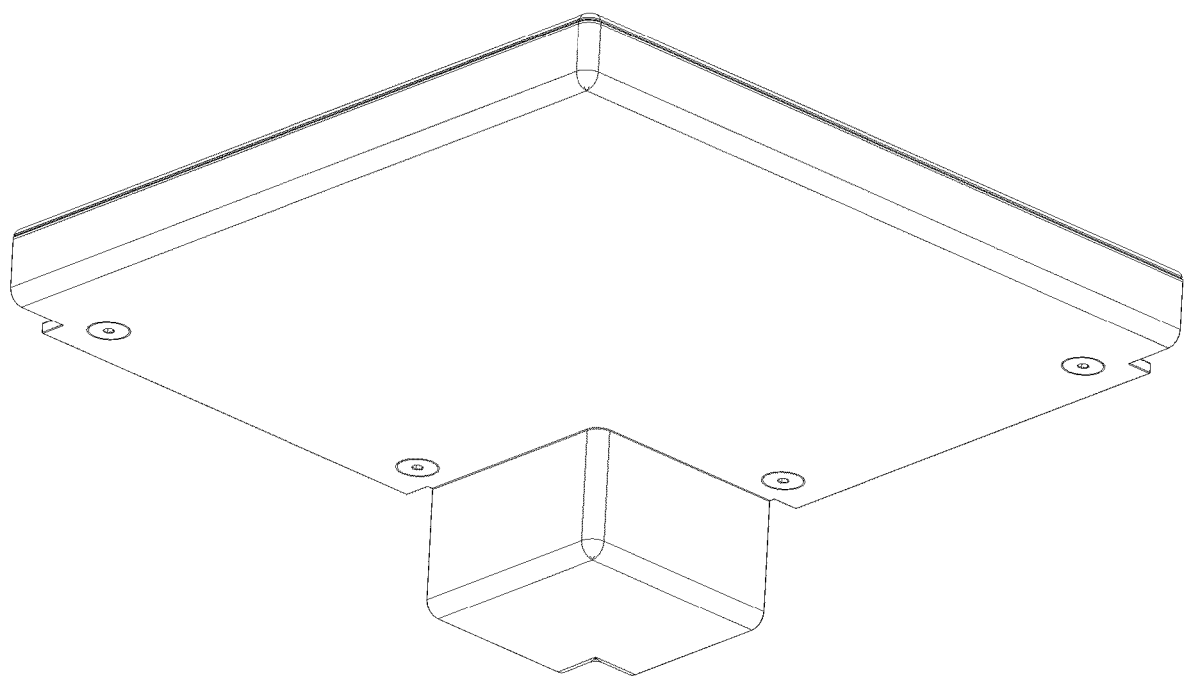
Figure 35:
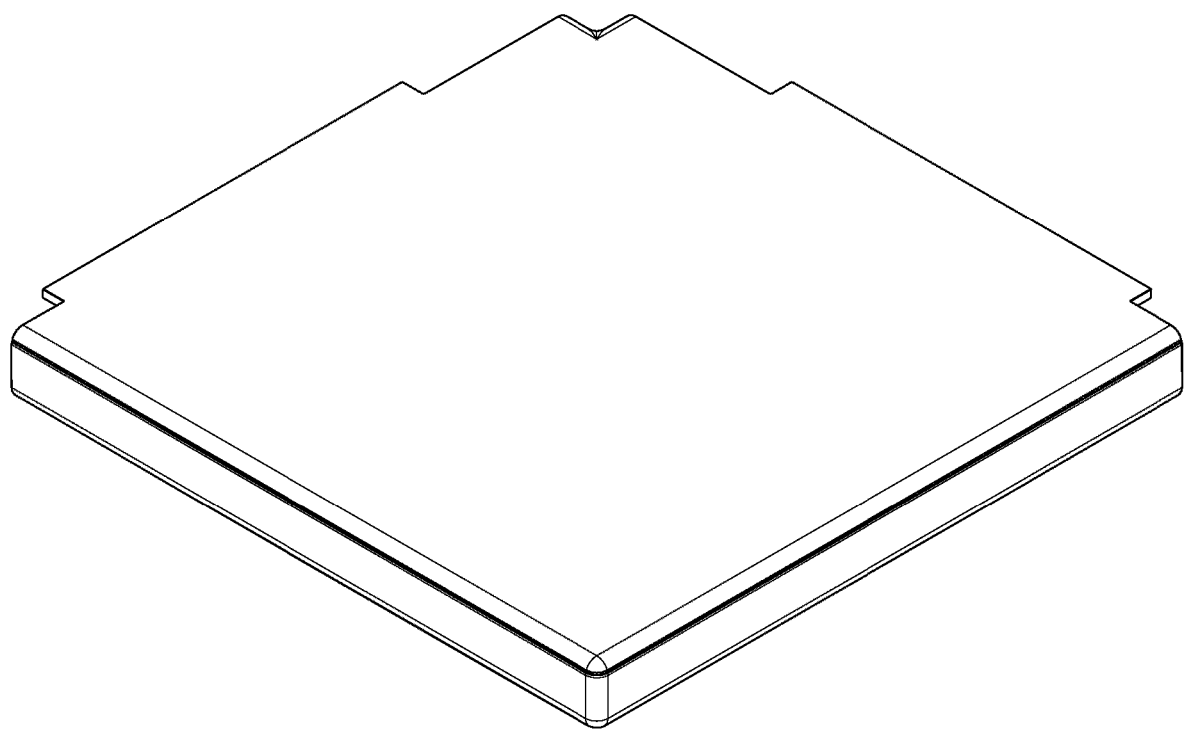

The luminaire structure is an illuminatable device capable of multiple states of illumination. The broken radiating line representations shown in FIGS. 29 and 31 are provided for the purpose of illustrating illumination surface regions, in a state of illumination and are not intended to depict any particular color, texture, reflectivity, or material. Light providing the illumination in an illuminated state is not indicated to be nor intended to be emanating from any particular source or type of lighting device. Further, the broken line radiating line representations may also apply to any one or more or less surfaces in the embodiments of FIGS. 29 to 31, as well as any one or more surfaces in the other example embodiments, as represented by any one or more of the figures herein. The article is not limited to the example embodiments shown herein with the broken line radiating line illumination representations. Rather, example embodiments also encompass illustrated embodiments without the broken line radiating line illumination representations on any one or more of the surfaces presently shown therewith. The subject matter herein includes any of the present figures, or new figures based on the present figures and the present application sheets, with any removal or addition of such broken line radiating line illumination representations. Thus, any removal or addition of such broken line radiating line illumination representations is not new matter.

The luminaire structure is not limited to the scale shown here in the figures, and the subject matter depicted in the figures is not limited by the description given of the example embodiments, and includes the ornamental design for a luminaire structure as shown and described.

While the present disclosure describes various example embodiments, the disclosure is not so limited. To the contrary, the disclosure is intended to cover various modifications and equivalent arrangements, as will be readily appreciated by the person of ordinary skill in the art.

The invention claimed is:

1. A luminaire assembly comprising a first luminaire structure and a second luminaire structure, each configured for positioning in an illuminatable position on an enclosure surface, each of the first and second luminaire structures comprising a housing structure and an illumination structure extending outwardly from the housing structure, the illumination structure having at least one outer surface region which terminates at a longitudinal distal end region and at least one lateral edge region, wherein the respective lateral edge regions of the first and second luminaire structures are alignable to form an aligning interface therebetween, a clamp assembly configured for clamping the adjacent lateral end regions in the aligning interface to join the first and second luminaire structures together, the clamp assembly providing at least one outer clamp surface region which is configured to be complementary with the corresponding at least one outer surface region of each of the joined first and second luminaire structures.

2. The luminaire assembly as defined in claim 1, wherein the least one outer clamp surface region is configured to be coplanar with the corresponding at least one outer surface region of each of the joined first and second luminaire structures to present a substantially continuous outer surface region across the joined first and second luminaire structures through the aligning interface.

3. The luminaire assembly as defined in claim 1, wherein the housing structures have substantially equal cross-sectional first thicknesses, and the illumination structures have substantially equal cross-sectional second thicknesses, wherein the second thicknesses are smaller than the first thicknesses.

4. The luminaire assembly as defined in claim 1, wherein each illumination structure includes a pair of opposed outer surface regions which are defined by a pair of outer panels extending between the housing structure and the longitudinal edge region.

5. The luminaire assembly as defined in claim 4, wherein at least one of the outer panels is configured to emit light.

6. The luminaire assembly as defined in claim 1, wherein the clamp assembly includes a pair of clamp elements, each to engage the lateral edge regions in the aligning interface.

7. The luminaire assembly as defined in claim 6, wherein each illumination structure includes at least one support arm extending along the lateral end region, to provide a pair of adjacent support arms at the aligning interface, each clamp element configured to engage each of the pair of adjacent support arms along the aligning interface, and to extend between a corresponding pair of adjacent outer surface regions.

8. The luminaire assembly as defined in claim 7, wherein the support arms and the clamp elements are configured to draw the support arms toward one another, as the clamp elements are drawn toward one another at the aligning interface.

9. The luminaire assembly as defined in claim 8, wherein each clamp element includes a pair of opposed first locking formations extending along opposite sides thereof, and each support arm includes a pair of opposed second locking formations along opposite sides thereof, wherein each of the first locking formations engages a corresponding second formation which the clamp elements engage in the aligning interface.

10. The luminaire assembly as defined in claim 9, wherein each illumination structure comprises a longitudinal end cap segment extending along the corresponding longitudinal edge region and a pair of lateral edge regions, each with a corresponding support arm, wherein the support arms are releasably secured to the end cap segment.

11. The luminaire assembly as defined in claim 7, wherein each luminaire structure includes at least one light guide with at least one outer panel on one side thereof, with one of the support arms at a corresponding lateral boundary of at least one of the light guide and outer panel, and a longitudinal end cap segment, wherein the support arms are releasably secured to the end cap segment.

12. The luminaire assembly as defined in claim 11, wherein the light guide includes an outer longitudinal light guide boundary, and the end cap segment includes a passage to receive the outer longitudinal light guide boundary.

13. The luminaire assembly as defined in claim 7, wherein each support arm is secured to the housing structure.

14. The luminaire assembly as defined in claim 1, further comprising a track structure for mounting on the enclosure surface, the track structure configured to receive a plurality of anchoring fasteners slidably mounted thereon, with each fastener adjustable in position along the track structure to align with complementary passages in the housing structures.

15. The luminaire assembly as defined in claim 14, wherein the track structure and housing structure present complementary slidable-contact surfaces through which the anchoring fasteners extend to anchor the luminaire assembly on the enclosure surface, wherein each housing structure has a thin walled hollow cross sectional configuration, enabling the housing structure to flex to accommodate variations in the enclosure wall surface.

* * * * *